US012761344B2

(12) United States Patent
Phan Huy et al.

(10) Patent No.: US 12,761,344 B2
(45) Date of Patent: Oct. 13, 2026

(54) METHOD FOR DETERMINING A GRAPH MODELLING A GEOGRAPHICAL ZONE, SYSTEM FOR NAVIGATING WITHIN THE ZONE USING SAID GRAPH

(71) Applicant: Orange, Issy-les-Moulineaux (FR)

(72) Inventors: Dinh Thuy Phan Huy, Châtillon Cedex (FR); Rita Ibrahim, Châtillon Cedex (FR)

(73) Assignee: ORANGE, Issy-les-Moulineaux (FR)

( * ) Notice: Subject to any disclaimer, the term of this patent is extended or adjusted under 35 U.S.C. 154(b) by 347 days.

(21) Appl. No.: 18/251,685

(22) PCT Filed: Oct. 27, 2021

(86) PCT No.: PCT/FR2021/051896
§ 371 (c)(1),
(2) Date: May 3, 2023

(87) PCT Pub. No.: WO2022/096807
PCT Pub. Date: May 12, 2022

(65) Prior Publication Data

US 2023/0408681 A1 Dec. 21, 2023

(30) Foreign Application Priority Data

Nov. 4, 2020 (FR) ...................................... 2011301

(51) Int. Cl.
*G01S 13/89* (2006.01)
*G01C 21/00* (2006.01)
(Continued)

(52) U.S. Cl.
CPC ............ *G01S 13/89* (2013.01); *G01C 21/206* (2013.01); *G01C 21/383* (2020.08);
(Continued)

(58) Field of Classification Search
None
See application file for complete search history.

(56) References Cited

U.S. PATENT DOCUMENTS 8,159,329 B1 * 4/2012 Killian .................. G01C 21/20 340/8.1
2016/0223341 A1 * 8/2016 Engelen .............. G01C 21/206
(Continued)

FOREIGN PATENT DOCUMENTS

CN 102831451 A * 12/2012
WO WO 2007/028827 A1 3/2007

OTHER PUBLICATIONS

International Search Report and Written Opinion dated Mar. 31, 2022 for Application No. PCT/FR2021/051896.
(Continued)

*Primary Examiner* — Vladimir Magloire
*Assistant Examiner* — Ashley Brown Raynal
(74) *Attorney, Agent, or Firm* — Knobbe, Martens, Olson & Bear, LLP

(57) ABSTRACT

A method is described for determining a graph modelling a zone comprising at least one transmitting device for back-scattering an ambient signal, emitted by a transmitting device, towards a receiving device (for detection by said receiving device. The method includes obtaining at least one coverage area of said zone, said at least one coverage area having been determined for a location of said zone and corresponding to a datum identifying the transmitting device or devices detected by the receiving device when the transmitting device occupies said location. The method also includes determining a graph of which at least one vertex consists of said at least one coverage area, two vertices of said graph being connected by an edge if the coverage areas
(Continued)

relating to said two vertices comprise at least one transmitting device detected in common.

15 Claims, 11 Drawing Sheets

(51) Int. Cl.
*G01C 21/20* (2006.01)
*G01S 13/87* (2006.01)
*G01S 13/76* (2006.01)

(52) U.S. Cl.
CPC .......... *G01S 13/876* (2013.01); *G01S 13/878* (2013.01); *G01S 13/765* (2013.01)

(56) References Cited

U.S. PATENT DOCUMENTS

2016/0371394 A1 12/2016 Shahidi et al.
2019/0072390 A1* 3/2019 Wang ................. G06K 7/10386

OTHER PUBLICATIONS

Van Huynh Nguyen et al. "Ambient Backscatter Communications: A Contemporary Survey" IEEE Communications Surveys & Tutorials, vol. 20, No. 4, 2018, pp. 2889-2922.

* cited by examiner

Fig. 1
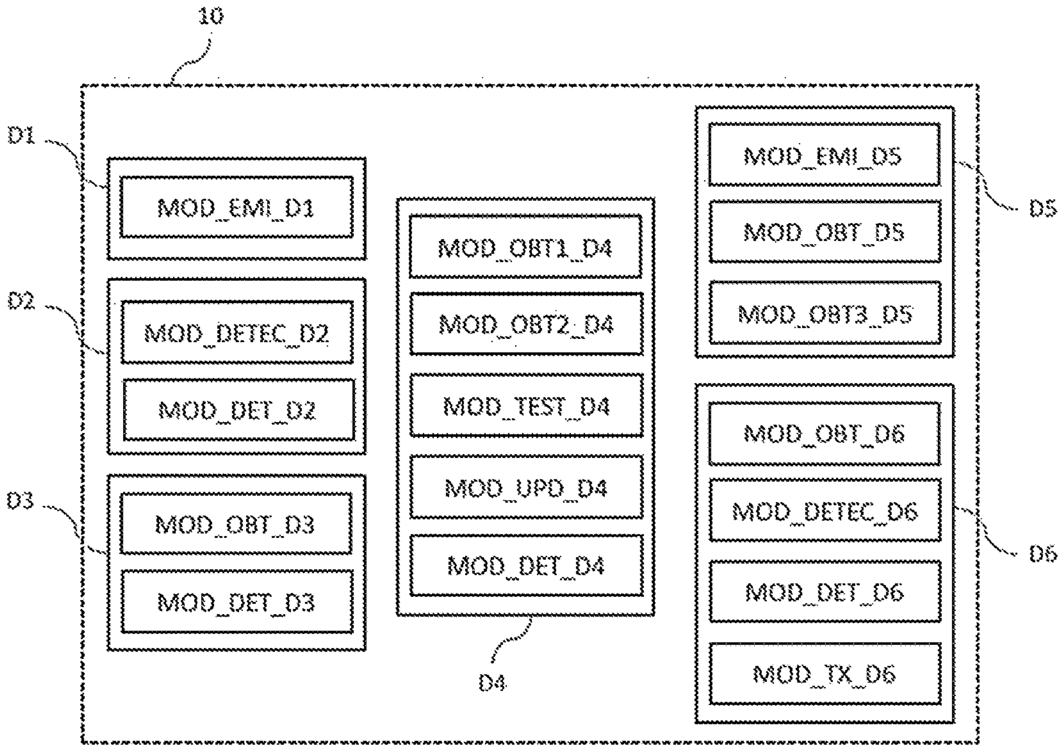
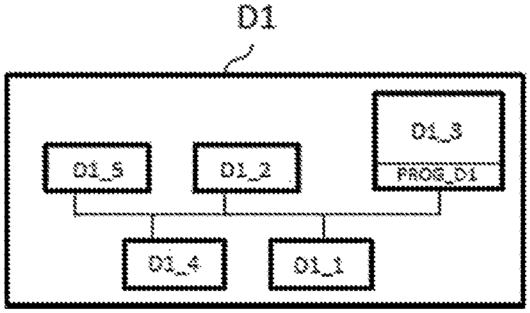
Fig. 2
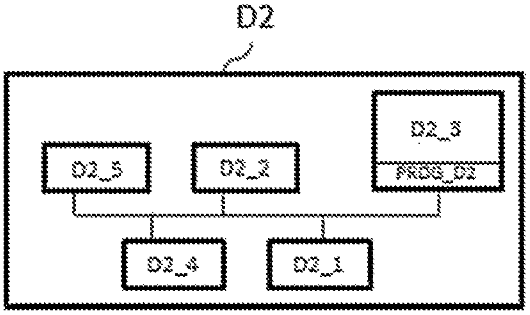
Fig. 3

METHOD FOR DETERMINING A GRAPH MODELLING A GEOGRAPHICAL ZONE, SYSTEM FOR NAVIGATING WITHIN THE ZONE USING SAID GRAPH

RELATED APPLICATIONS

This application is the U.S. National Phase of Application No. PCT/FR2021/051896 entitled "METHOD FOR DETERMINING A GRAPH MODELLING A GEOGRAPHICAL ZONE, SYSTEM FOR NAVIGATING WITHIN THE ZONE USING SAID GRAPH" and filed Oct. 27, 2021, which claims the benefit of French Patent Application No. 2011301, filed Nov. 4, 2020, each of which is incorporated by reference in its entirety.

PRIOR ART

The present invention belongs to the general field of the navigation in a geographical area. It more particularly relates to a method for determining a graph modeling a geographical area as well as a method for navigating in the area by means of said graph. It also relates, in particular, to a navigation system configured to implement said navigation method. The invention finds a particularly advantageous application, although without limitation, when the geographical area considered is situated in a closed environment (called indoor geographical area).

The navigation within a geographical area can be defined as being the combination of localization techniques and route search.

With regard to the localization, it is about being able to determine the position(s) occupied by an object or a person during a movement within said area. For this purpose, a position is for example determined in absolute terms (i.e. the geographical coordinates associated with said position are determined in a given reference frame). A position can also be determined relatively with respect to the environment in which the object or the person whose position is sought is located (for example, a relative position can be obtained by determining distances separating the object or the person in question of fixed elements positioned in said environment).

The route search techniques, for their part, aim to orient the object or the person wishing to move in the geographical area in order to reach a targeted location. It is therefore about determining one or several paths to follow in order to join said targeted location. The determination of such paths is based in particular on the location of said object or said person.

Conventionally, the navigation in a geographical area situated in an open environment (i.e. in a non-partitioned environment) is done using the Global Positioning System or GPS. In this way, it is possible to access the two-dimensional coordinates (latitude, longitude) of an object or an equipped person, which in fine allows determining one or several routes to follow on a map established in accordance with the coordinate system considered.

However, the use of the GPS system cannot be envisaged with regard to the navigation in a geographical area situated inside a closed environment. Indeed, in a closed environment, the GPS system suffers from irregular connectivity linked to the presence of different rooms separated from each other by walls, doors, stairs, etc. Moreover, the GPS system proves to be unsuitable for the closed environments for which it is important to take into account an additional dimension of space linked to the presence of floors, stairs, etc.

Solutions have therefore been proposed to circumvent this inability to exploit the GPS system for the navigation in a closed environment. Thus, it has in particular been proposed to use RFID (Radio Frequency IDentification) technology.

More particularly, it is firstly about affixing electronic chips, also called radio tags, in different places of an area of a closed environment (for example on walls, on objects, etc.). Then, secondly, it is about manually taking a reading of the coordinates respectively associated with the places in which said radio tags have been affixed. Finally, when a user tries to move in said area, he takes an RFID reader able to identify, in a manner known per se, the radio tags, and to determine the position of said RFID reader from the identifiers of the radio tags as well as their respective coordinates. Knowing his position, said user can therefore locate himself in said area and thus move therearound. For more details on the use of the RFID technology for the navigation in an area of a closed environment, it is possible to consult the following document: "Accurate Self-Localization in RFID Tag Information Grids Using FIR Filtering", J. J. Pomarico-Franquiz, Y. S. Shmaliy, IEEE Transactions on Industrial Informatics, vol. 10, no. 2, pp. 1317-1326, Mai 2014.

Although the RFID technology has the advantage of being passive (i.e. a radio tag does not need to be connected to an energy source to operate), its implementation for the navigation in an area of an open or closed environment encounters certain limitations. It is indeed necessary to deploy specific hardware (RFID reader, RFID tags), which makes it a complex and expensive solution. Moreover, it is also necessary to read the (absolute) coordinates of the radio tags deployed, which is particularly tedious and time-consuming.

DISCLOSURE OF THE INVENTION

The present invention aims to overcome all or part of the drawbacks of the prior art, in particular those set out above, by proposing a solution that allows navigating in a geographical area, particularly in a geographical area situated in a closed environment, more efficiently than the solutions of the prior art. By "more efficient navigation", reference is made here to a navigation whose implementation is simple, inexpensive and rapid.

To this end, and according to a first aspect, the invention relates to a method for determining a graph modeling a geographical area, said area including at least one transmitter device configured to backscatter towards a receiver device an ambient signal emitted by an emitter device so as to be detected by said receiver device. Said method includes steps of:

- obtaining at least one footprint of said area, said at least one footprint having been determined for a location of said area and corresponding to a data identifying, among said at least one transmitter device, the transmitter device(s) detected by the receiver device when the emitter device emits the ambient signal from the location associated with said footprint,
- determining a graph whose vertex or vertices is/are formed of said at least one footprint, two vertices of said graph being connected by an edge if the footprints relating to said two vertices include at least one transmitter device detected in common.

According to a second aspect, the invention relates to a method for emitting an ambient signal in a geographical area, said area including at least one transmitter device configured to backscatter towards a receiver device the ambient signal emitted by an emitter device so as to be detected by said receiver device. Said method includes steps of:

- moving the emitter device so as to reach at least one location of said area,
- emitting said ambient signal when said at least one location is reached.

According to a third aspect, the invention relates to a method for determining at least one footprint of a geographical area, said area including at least one transmitter device configured to backscatter towards a receiver device an ambient signal emitted by an emitter device so as to be detected by said receiver device. Said method includes, for at least one location of said area at which the emitter device emits the ambient signal, steps of:

- detecting, by said receiver device, one or several transmitter devices,
- determining a data identifying, among said at least one transmitter device, the transmitter device(s) detected by the receiver device, said data corresponding to a footprint of the geographical area for said at least one location.

According to a fourth aspect, the invention relates to a method for determining a path, called "intermediate path", in a geographical area, said area including at least one transmitter device configured to backscatter towards a receiver device an ambient signal emitted by an emitter device so as to be detected by said receiver device, said intermediate path being configured to connect a starting location to a neighborhood of a given transmitter device, called "target transmitter device", among said at least one transmitter device. Said method includes steps of:

- obtaining a footprint, called "current footprint", determined for said starting location according to a method for determining at least one footprint in accordance with the invention,
- if said current footprint does not form a vertex of a graph determined according to a method for determining a graph in accordance with the invention, updating the graph so that the current footprint forms a vertex of the updated graph, two vertices of said updated graph being connected by an edge if the footprints relating to said two vertices include at least one transmitter device detected in common,
- determining a sequence of footprints of the graph updated when appropriate, said sequence forming a path, called "intermediate path", of minimum length to connect the starting location to a footprint of the updated graph identifying said target transmitter device.

In particular modes of implementation, the intermediate path is determined by means of the Dijkstra algorithm.

According to a fifth aspect, the invention relates to a method for moving in a geographical area, said area including at least one transmitter device configured to backscatter towards a receiver device an ambient signal emitted by an emitter device so as to be detected by said receiver device, said emitter device being intended to connect a starting location to a neighborhood of a given transmitter device among said at least one transmitter device. Said method includes steps of:

- emitting the ambient signal at said starting location,
- obtaining a set of transmitter devices, called "locating set", formed of the transmitter device(s) identified by the first footprint of an intermediate path determined according to a method for determining an intermediate path in accordance with the invention and not identified by a footprint determined for said starting location according to a method for determining at least one footprint in accordance with the invention,
- obtaining one or several data, called "sensory data", making it possible to identify in a sensory manner, in the environment of said area, the transmitter device(s) of said locating set,
- moving the emitter device in the area so as to reach a location called "intermediate location" satisfying a neighborhood criterion with at least one transmitter device belonging to said locating set, said movement being performed by using said sensory data.

According to a sixth aspect, the invention relates to a method for determining a location, called "intermediate location", in a geographical area, said area including at least one transmitter device configured to backscatter towards a receiver device an ambient signal emitted by an emitter device so as to be detected by said receiver device, said emitter device being intended to connect a starting location to a neighborhood of a given transmitter device among said at least one transmitter device. Said method includes steps of:

- obtaining a set of transmitter devices, called "locating set", formed of the transmitter device(s) identified by the first footprint of an intermediate path determined according to a method for determining an intermediate path in accordance with the invention and not identified by a footprint determined for said starting location according to a method for determining at least one footprint in accordance with the invention, and when the emitter device moves according to a moving method in accordance with the invention and further emits the ambient signal during its movement:

- detecting, by said receiver device, one or several transmitter devices,
- determining a location called "intermediate location" satisfying a neighborhood criterion making it possible to verify whether the emitter device has reached a location for which the receiver device detects, from the ambient signal emitted by said emitter device, a number of transmitter devices at least equal to a given fraction of the number of transmitter devices belonging to said locating set,
- transmitting to the emitter device an information data able to indicate that the intermediate location is reached.

According to a seventh aspect, the invention relates to a method for navigating in a geographical area, said area including at least one transmitter device configured to backscatter towards a receiver device an ambient signal emitted by an emitter device so as to be detected by said receiver device. Said method includes a set of steps of:

- determining an intermediate path according to a method in accordance with a method for determining an intermediate path in accordance with the invention,
- moving in said area according to a moving method in accordance with the invention.

Furthermore, said set of steps is iterated as long as the first footprint of the intermediate path does not identify said target transmitter device, the starting location considered in an iteration of said set of steps corresponding to the intermediate location considered in the previous iteration, and the graph considered in an iteration of said set of steps for a possible update corresponding to the graph to which the intermediate path determined during the previous iteration belongs.

Thus, the implementation of the different methods according to the invention, and particularly of said navigation method, is based on the use of an ambient backscatter communication technology, which is energy efficient and particularly simple to deploy.

Indeed, the use of this ambient backscatter technology does not require the deployment of specific hardware elements for its implementation, with the exception of one or several transmitter devices able to backscatter an ambient signal. Therefore, the invention allows envisaging the situation in which an ambient signal is emitted by a hardware element already present in the geographical area, such as a cellular phone for example. In the same way, a signal backscattered by a transmitter device can be received by a hardware element already present in the geographical area, such as for example a base station.

It is further understood that the fact of using the ambient backscatter communication technology advantageously allows dispensing with the use of GPS signals, so that the invention is particularly well suited to the navigation in a geographical area situated in a closed environment.

The navigation solution proposed by the invention further differs fundamentally from the prior art in that it does not require knowing the coordinates of the transmitter device(s) deployed in the geographical area. The invention is indeed based on a graph formed of footprints, a footprint being attached to the detection (by ambient backscatter) of transmitter devices of said geographical area. However, there is no need to know the coordinates of transmitter devices thus detected to form footprints, and therefore in fine the graph from which it is possible to build a navigation route (this route being built progressively with the implementation of the navigation method, via the first footprints belonging to the determined intermediate paths). It follows from these provisions that the implementation of the invention is quick (consumes little time) and easy.

In particular modes of implementation of the moving method and/or of the navigation method, said neighborhood criterion is satisfied if the emitter device reaches a location at which is situated a given or any transmitter device among the transmitter devices belonging to said locating set.

In particular modes of implementation of the navigation method, said set of steps also includes a step of determining an intermediate location according to a method for determining an intermediate location in accordance with the invention.

According to an eighth aspect, the invention relates to a computer program including instructions for the implementation of any one of the methods according to the invention when said computer program is executed by a computer.

This program can use any programming language, and be in the form of source code, object code or intermediate code between source code and object code, such as in partially compiled form or in any other desirable form.

According to a ninth aspect, the invention relates to a computer-readable information or recording medium on which a computer program according to the invention is recorded.

The information or recording medium can be any entity or a device capable of storing the program. For example, the medium can include a storage means, such as a ROM, for example a CD ROM or a microelectronic circuit ROM, or a magnetic recording means, for example a floppy disk or a hard disk.

On the other hand, the information or recording medium can be a transmissible medium such as an electrical or optical signal, which can be conveyed via an electrical or optical cable, by radio or by other means. The program according to the invention can be particularly downloaded from an Internet-type network.

Alternatively, the information or recording medium can be an integrated circuit in which the program is incorporated, the circuit being adapted to execute or to be used in the execution of the method in question.

According to a tenth aspect, the invention relates to a device for determining a graph modeling a geographical area, said area including at least one transmitter device configured to backscatter towards a receiver device an ambient signal emitted by an emitter device so as to be detected by said receiver device. Said determination device includes:

- an obtaining module configured to obtain at least one footprint of said area, said at least one footprint having been determined for a location of said area and corresponding to a data identifying, among said at least one transmitter device, the transmitter device(s) detected by the receiver device when the emitter device emits the ambient signal from the location associated with said footprint,
- a determination module configured to determine a graph whose vertex or vertices is/are formed of said at least one footprint, two vertices of said graph being connected by an edge if the footprints relating to said two vertices include at least one transmitter device detected in common.

According to an eleventh aspect, the invention relates to a device for emitting an ambient signal in a geographical area, said area including at least one transmitter device configured to backscatter towards a receiver device the ambient signal emitted by said emitter device so as to be detected by said receiver device. Said emitter device includes an emitter module configured to emit said ambient signal when, following a movement of said emitter device to reach at least one location of said area, said at least one location has been reached.

According to a twelfth aspect, the invention relates to a device for determining at least one footprint of a geographical area, said area including at least one transmitter device configured to backscatter towards a receiver device an ambient signal emitted by an emitter device so as to be detected by said receiver device. Said determination device includes a determination module configured to determine a data identifying, among said at least one transmitter device, the transmitter device(s) detected by the receiver device when the emitter device emits the ambient signal from at least one location of said area, said data corresponding to a footprint of the geographical area for said at least one location.

According to a thirteenth aspect, the invention relates to a device for determining a path, called "intermediate path", in a geographical area, said area including at least one transmitter device configured to backscatter towards a receiver device an ambient signal emitted by an emitter device so as to be detected by said receiver device, said intermediate path being configured to connect a starting location to a neighborhood of a given transmitter device, called "target transmitter device", among said at least one transmitter device, said determination device including:

- a first obtaining module configured to obtain a graph determined by a device for determining a graph according to the invention,
- a second obtaining module configured to obtain a footprint, called "current footprint", determined for said starting location by a device for determining at least one footprint according to the invention, a test module configured to verify whether said current footprint forms or does not form a vertex of the graph, an update module configured to update, if said current footprint does not form a vertex of the graph, the graph so that the current footprint forms a vertex of the updated graph, two vertices of said updated graph being connected by an edge if the footprints relating to said two vertices include at least one transmitter device detected in common, a determination module configured to determine a sequence of footprints of the graph updated when appropriate, said sequence forming a path, called "intermediate path", of minimum length to connect the starting location to a footprint of the updated graph identifying said target transmitter device.

According to a fourteenth aspect, the invention relates to a device for emitting an ambient signal in a geographical area, said area including at least one transmitter device configured to backscatter towards a receiver device an ambient signal emitted by said emitter device so as to be detected by said receiver device. Said emitter device is intended to connect a starting location to a neighborhood of a given transmitter device among said at least one transmitter device, and includes:

an emission module configured to emit the ambient signal at said starting location, a first obtaining module configured to obtain a set of transmitter devices, called "locating set", formed of the transmitter device(s) identified by the first footprint of an intermediate path determined by a device for determining an intermediate path in accordance with the invention and not identified by a footprint determined for said starting location by a device for determining at least one footprint in accordance with the invention, a second obtaining module configured to obtain one or several data, called "sensory data", making it possible to identify in a sensory manner, in the environment of said area, the transmitter device(s) of said locating set.

According to a fifteenth aspect, the invention relates to a device for determining a location, called "intermediate location", in a geographical area, said area including at least one transmitter device configured to backscatter towards a receiver device an ambient signal emitted by an emitter device so as to be detected by said receiver device, said emitter device being intended to connect a starting location to a neighborhood of a given transmitter device among said at least one transmitter device. Said determination device includes:

a first obtaining module configured to obtain a set of transmitter devices, called "locating set", formed of the transmitter device(s) identified by the first footprint of an intermediate path determined by a device for determining an intermediate path in accordance with the invention and not identified by a footprint determined for said starting location by a device for determining at least one footprint in accordance with the invention, a detection module configured to detect, when the emitter device moves in the area by emitting the ambient signal, one or several transmitter devices, a determination module configured to determine, when the emitter device moves in the area by emitting the ambient signal, a location called "intermediate location" satisfying a neighborhood criterion making it possible to verify whether the emitter device has reached a location for which the receiver device detects, from the ambient signal emitted by said emitter device, a number of transmitter devices at least equal to a given fraction of the number of transmitter devices belonging to said locating set, a transmission module configured to transmit to the emitter device an information data able to indicate that the intermediate location is reached.

According to a sixteenth aspect, the invention relates to a system for navigating in a geographical area, said area including at least one transmitter device configured to backscatter towards a receiver device an ambient signal emitted by an emitter device so as to be detected by said receiver device. Said system includes a device for determining a graph according to the invention, a device for emitting an ambient signal according to the invention, a device for determining at least one footprint according to the invention, a device for determining a intermediate path according to the invention as well as a device for emitting an ambient signal and intended to connect a starting location to a neighborhood of a given transmitter device among said at least one transmitter device according to the invention.

In particular embodiments, said system further including a device for determining an intermediate location according to the invention.

BRIEF DESCRIPTION OF THE DRAWINGS

Other characteristics and advantages of the present invention will become apparent from the description given below, with reference to the appended drawings which illustrate one examplary embodiment without any limitation. On the figures:

FIG. 1 schematically represents, in its environment, one particular embodiment of a system for navigating in a geographical area according to the invention;

FIG. 2 schematically represents an example of hardware architecture of a device for emitting an ambient signal belonging to the navigation system of FIG. 1;

FIG. 3 schematically represents an example of hardware architecture of a device for determining at least one footprint belonging to the navigation system of FIG. 1;

DESCRIPTION OF THE EMBODIMENTS

Figure 4:
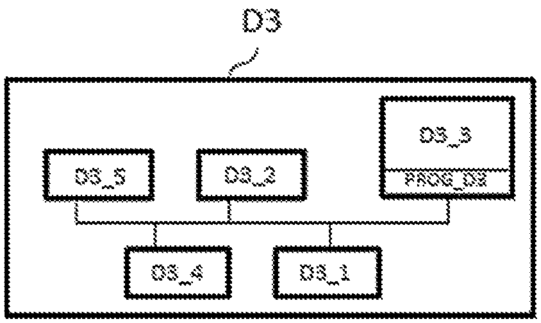
FIG. 4 schematically represents an example of hardware architecture of a device for determining a graph belonging to the navigation system of FIG. 1.

FIG. 1 schematically represents, in its environment, one particular embodiment of a navigation system 10 according to the invention.

For the following description, it is considered without limitation that the navigation able to be implemented by means of said navigation system 10 corresponds to a navigation in a geographical area Z situated in a closed environment ("indoor area"). For example, said area corresponds to a space situated in a hangar, a building, a personal dwelling, etc. In general, no limitation is attached to the closed environment that can be considered in the context of the present invention.

It is moreover important to note that the invention is not limited to the navigation in a geographical area situated in a closed environment. Indeed, the invention is also applicable to the case of a geographical area situated in an open environment (i.e. a non-partitioned environment).

In accordance with the invention, the navigation system 10 is configured to carry out processing operations making it possible to navigate within said area Z. These processing operations are carried out by the navigation system 10 in two phases, namely a navigation preparation phase and another phase of actual navigation in the area Z.

In its general principle, said first phase consists in determining a graph G modeling the area Z. Said graph G corresponds to an abstract representation of the area Z which can be assimilated to a mapping of the latter. Said graph G is intended to be used for the execution of the processing operations attached to said second phase which consists, for its part, in allowing the actual navigation in the area Z.

The aspects of the invention are firstly described in connection with the processing operations carried out during said navigation preparation phase.

In the embodiment illustrated in FIG. 1, the navigation system 10 includes an emitter device D1 configured to emit, according to an emission frequency comprised in a given frequency band called "emission band", a radio signal called "ambient signal". The aspects related to the instants at which said ambient signal is emitted by the emitter device D1 are described in detail later.

By "radio signal", reference is made here to an electromagnetic wave propagating by non-wired means, whose frequencies are comprised in the traditional spectrum of the radioelectric waves (from a few hertz to several hundred gigahertz).

By way of non-limiting example, the ambient signal is a 4G mobile telephone signal emitted in the emission band [811 MHz, 821 MHz] by the emitter device D1. It should however be specified that the invention remains applicable to other types of radio signals, such as for example a mobile telephone signal other than 4G (for example 2G, 3G, 5G), a Wi-Fi signal, etc. In general, no limitation is attached to the ambient radio signal that can be considered in the context of the present invention as long as the latter can be used to communicate by ambient backscatter as described below.

In the embodiment of FIG. 1, the navigation system 10 also includes a receiver device D2 distinct from the emitter device D1, and in particular configured to receive the ambient signal emitted by the emitter device D1.

For the following description, it is considered without limitation that the emitter device D1 is a mobile terminal of the cellular telephone type, for example a smartphone, belonging to a user U1 and henceforth called "mapping terminal". It is also considered for the remainder of the description that the receiver device D2 is a base station.

It should however be noted that no limitation is attached to the forms respectively taken by the emitter D1 and receiver D2 devices, provided that they are able to communicate with each other within a wireless communication network (here in the emission band). Thus, according to another example, the emitter device D1 can correspond to a smartphone, or a touch pad, or a personal digital assistant, or a personal computer, etc., able to communicate according to the Wi-Fi protocol, and the receiver device D2 can correspond to a Wi-Fi hotspot.

In the embodiment of FIG. 1, the area Z includes a plurality of transmitter devices T (also called tags) configured to backscatter towards the base station D2 the ambient signal emitted by the mapping terminal D1.

For the following description, it is considered without limitation that said transmitter devices T are fixed in the area Z (i.e. the respective positions of the transmitter devices T are invariant over time), for example by being affixed to fixed objects disposed in the area Z and/or by being affixed to elements (wall, door, stairs, etc.) forming the local structure of the closed environment comprising the area Z.

The choice according to which the transmitter devices T are fixed is however just a variant of embodiment of the invention, and nothing excludes envisaging that all or part of the transmitter devices are mobile, for example by being affixed to objects able to move in the area Z. Moreover, no limitation is attached to the number of transmitter devices that can be considered in the present invention. Preferably, the number of transmitter devices present in the area Z is greater than or equal to 3. However, nothing excludes envisaging a number less than 3 or even the case where a single transmitter device is present in the area Z. In general, those skilled in the art are able to adapt the following description to the different cases mentioned above (mobile transmitter device, single transmitter device in the area Z).

As mentioned above, each transmitter device T is configured to transmit to the base station D2 a signal, called "backscattered signal", by ambient backscatter of the ambient signal. Said backscattered signal conventionally carries a message which, in the context of the present invention, includes a data for identifying said transmitter device T. In this way, each transmitter device T can be detected by the base station D2.

No limitation is attached to the nature of an identification data associated with a transmitter device T, provided that it allows distinguishing said transmitter device from the other transmitter devices arranged in the area Z. For example, each identification data can correspond to an alphanumeric identifier.

The transmission of the backscattered signal by a transmitter device T is performed by variation of the backscattering of the ambient signal, this variation relying on the possibility for the transmitter device T to modify the impedance presented to an antenna that equips it (not represented in the figures), depending on the identification data to be transmitted.

More specifically, each transmitter device T can be associated with operating states depending on the impedance presented to the antenna with which it is equipped. For the following description, it is considered without limitation that these states are a state called "backscatter" state (the transmitter device T can backscatter the ambient signal), as well as a contrary state called "non-backscattering" state (the transmitter device T cannot backscatter the ambient signal or, in other words, is "transparent" to the ambient signal). The impedance associated with the backscattering state typically corresponds to zero or infinite impedance, whereas the impedance associated with the non-backscattering state typically corresponds to the conjugate complex of the characteristic impedance of the antenna in the considered propagation medium and at the considered frequency.

It is important to note that the invention is not limited to this ideal case in which only two states respectively perfectly backscattering and perfectly non-backscattering would be considered. Indeed, the invention also remains applicable in the case where two states (first state and second state) are not perfectly backscattering/non-backscattering, provided that the variation of the backscattered waves is perceptible by the base station D2 which is intended to receive the data for identifying a transmitter device T.

The identification data intended to be transmitted by a transmitter device T to the base station D2, by means of the backscattered signal, is conventionally encoded by means of a set of symbols, comprising for example a symbol called "high" symbol (bit of value "1"), or a symbol called "low" symbol (bit of value "0"). The transmission of the identification data by variation of the ambient backscatter can therefore be performed, in a manner known per se, by alternation between said backscattering and non-backscattering states, each of said states being dedicated to the transmission of a symbol of a particular type (for example high symbol for the backscattering state and low symbol for the non-backscattering state, or vice versa). In other words, an identification data intended to be transmitted by a transmitter device T is transported to the base station D2 by modulation of the waves of the ambient signal (i.e. by retromodulation).

The processing operations aimed at backscattering said ambient signal are conventionally carried out by each of said transmitter devices T by implementing a backscattering method (not represented in the figures). To this end, each transmitter device T includes for example one or several processors and storage means (magnetic hard disk, electronic memory, optical disk, etc.) in which data and a computer program are stored in the form of a set of program code instructions to be executed to implement said backscattering method.

Alternatively or additionally, each transmitter device T also includes one or several programmable logic circuit(s), of the FPGA, PLD, etc. type, and/or specific integrated circuits (ASIC), and/or a set of discrete electronic components, etc. adapted to implement the backscattering method.

In other words, each transmitter device T includes a set of means configured by software (specific computer program) and/or hardware (FPGA, PLD, ASIC, etc.) to implement the backscattering method.

The base station D2 is, for its part, further configured to carry out processing operations aimed at decoding the signals backscattered by the transmitter devices T, so as to obtain the respective data for identifying said transmitter devices T. Each identification data is obtained by implementing a decoding method (not represented in the figures). It is noted that the decoding of the backscattered signals in fine allows detecting one or several transmitter devices T.

For this purpose, the base station D2 includes for example one or several processors and storage means (magnetic hard disk, electronic memory, optical disk, etc.) in which data and a computer program are stored in the form of a set of program code instructions to be executed to implement said decoding method.

Alternatively or additionally, the base station D2 also includes one or several programmable logic circuits, of the FPGA, PLD, etc. type, and/or specific integrated circuits (ASIC), and/or a set of discrete electronic components, etc. adapted to implement the decoding method.

In other words, the base station D2 includes a set of means configured by software (specific computer program) and/or hardware (FPGA, PLD, ASIC, etc.) to implement the decoding method.

The specific aspects concerning the signal processing techniques for the transmission of data by ambient backscatter as well as the decoding of these data are known and for example detailed in the following document to which those skilled in the art can refer: "Ambient Backscatter Communications: A Contemporary Survey", N. Van Huynh, D. Thai Hoang, X. Lu, D. Niyato, P. Wang, D. In Kim, IEEE Communications Surveys & Tutorials, vol. 20, no. 4, pp. 2889-2922, Fourthquarter 2018.

Particularly, it is known that the possibility of transmitting data by ambient backscatter by a transmitter device T depends on its remoteness from the source of the ambient signal, i.e. the mapping terminal D1. It is also known that the possibility of decoding a signal backscattered by the base station D2 depends on its remoteness from the emitter device at the origin of said backscattered signal. Ultimately, these provisions involve that all the transmitter devices T are not necessarily detected at the same time when the mapping terminal D1 emits the ambient signal. These aspects are described in more detail below.

It is also noted that, conventionally with regard to the ambient backscatter communication technology, the mapping terminal D1, the base station D2, and all the transmitter devices T are distinct from each other.

In the context of the navigation preparation phase, and according to the embodiment of FIG. 1, the mapping terminal D1 is configured to emit the ambient signal, at a plurality of locations POS_1, . . . , POS_P distinct from each other (P being an integer strictly greater than 1) of the area Z, by implementing an emission method according to the invention. The emission of the ambient signal at a location POS_i (i being an index comprised between 1 and P) aims to allow the detection, by the base station D2, of the transmitter device(s) T illuminated by the mapping terminal D1 from said location POS_i, and whose generated backscattered signal(s) arrive, with a suitable power level, to the level of the base station D2.

According to one exemplary embodiment, the locations POS_1, . . . , POS_P correspond to given locations of the area Z. For this purpose, said locations POS_1, . . . , POS_P can for example be visually reported in the closed environment, so that the user U1 in possession of the mapping terminal D1 can move in the area Z so as to successively reach said locations POS_1, . . . , POS_P.

According to another example, the locations POS_1, . . . , POS_P are not previously indicated in the area Z, and correspond to stopping points for the user U1 in possession of the mapping terminal D1 when he moves in the area Z. These stopping points are for example entirely random or even linked to sub-areas of interest for said user U1 within said area Z.

Whether the locations POS_1, . . . , POS_P correspond to given locations or not, no limitation is attached to the way in which said locations POS_1, . . . , POS_P are distributed within the area Z. Preferably, said locations POS_1, . . . , POS_P are distributed in a substantially uniform manner in the area Z, so as to promote the detection of a maximum of transmitter devices T by the base station D2.

Although a plurality of locations POS_1, . . . , POS_P are considered in the embodiment of FIG. 1, it should however be noted that no limitation is attached to the number of locations that can be considered in the present invention. Thus, nothing excludes envisaging the case of a single location at which the ambient signal is emitted by the mapping terminal D1. Here again, those skilled in the art are able to adapt the following description to this particular case.

For the following description, it is now considered that said locations POS_1, . . . , POS_P correspond to given locations of the area Z.

FIG. 2 schematically represents an example of hardware architecture of the mapping terminal D1 belonging to the navigation system 10 of FIG. 1, for the implementation of said emission method.

As illustrated in FIG. 2, the mapping terminal D1 has the hardware architecture of a computer. Thus, the mapping terminal D1 includes, in particular, a processor D1_1, a random access memory D1_2, a read only memory D1_3 and a non-volatile memory D1_4. It further includes a communication module D1_5.

The read only memory D1_3 of the mapping terminal D1 constitutes a recording medium in accordance with the invention, readable by the processor D1_1 and on which a computer program PROG_D1 in accordance with the invention is recorded, including instructions for the execution of steps of the emission method according to the invention. The program PROG_D1 defines at least one functional module of the mapping terminal D1, which is based on or controls the hardware elements D1_1 to D1_5 of the mapping terminal D1 mentioned above, and which in particular comprises an emission module MOD_EMI_D1 configured to emit said ambient signal when, following a movement of said mapping terminal D1 to reach a location POS_i (i being an integer index comprised between 1 and P) among said plurality of locations POS_1, . . . , POS_P, said at least one location POS_i has been reached.

The communication module D1_5 in particular allows the mapping terminal D1 to communicate with the base station D2, for example to exchange data via the wireless communication network. Said communication module D1_5 in particular integrates the emission module MOD_EMI_D1.

In the context of the navigation preparation phase, and according to the embodiment of FIG. 1, the base station D2 is for its part configured to determine a plurality of footprints EMP_1, . . . , EMP_P of the area Z, by implementing a footprint determination method according to the invention.

Each footprint EMP_i (i being an integer index comprised between 1 and P) is determined for a location POS_i of the area Z and corresponds to a data identifying, among the transmitter devices T of the area Z, the transmitter device(s) detected by the base station D2 when the mapping terminal D1 emits the ambient signal from the location POS_i associated with said footprint EMP_i.

In accordance with the principles of implementation of the ambient backscatter communication technology, the transmitter device(s) T likely to be detected by the base station D2 are situated at a distance of the order of one meter, even a few meters, from the mapping terminal D1 emitting the ambient signal.

For the following description, the convention according to which a footprint EMP_i is a data taking (numerically) the form of a vector of numbers is adopted. The components of this vector are respectively associated with the transmitter devices T situated in the area Z.

More particularly, to illustrate the form taken by such a vector, it is assumed that the number of transmitter devices T is equal to K, where K is an integer strictly greater than 1. It is further assumed that the transmitter devices are classified so that it is possible to assign to each transmitter device an index k comprised between 1 and K. Thus, the transmitter device with which the index k is associated is denoted T_k.

In other words, in accordance with the notations adopted here without limitation, the vector representing the footprint EMP_i is written: [EMP_i(1), EMP(2), . . . EMP_i(k), . . . , EMP_i(K)], the component EMP_i(k) being associated with the transmitter device T_k, and indicating whether said transmitter device T_k is detected by the base station D2 when the mapping terminal D1 emits the ambient signal from the location POS_i associated with said footprint EMP_i. For the following description, it is also considered that a component EMP_i(k) of a footprint EMP_i can take two distinct values: either the value 0 indicating an absence of detection of the transmitter device T_k, or the value 1 indicating a detection of the transmitter device T_k.

It should be noted that, for the purpose of simplifying the description, the notation “T_k” is only used to designate a particular transmitter device among all the transmitter devices situated in the area Z. Otherwise, and as already done before, the notion “T” is used to designate any one or several transmitter devices among all the transmitter devices situated in the area Z.

FIG. 3 schematically represents an example of hardware architecture of the base station D2 belonging to the navigation system 10 of FIG. 1.

As illustrated in FIG. 3, the base station D2 has the hardware architecture of a computer.

Thus, the base station D2 includes, in particular, a processor D2_1, a random access memory D2_2, a read only memory D2_3 and a non-volatile memory D2_4. It further includes a communication module D2_5.

The read only memory D2_3 of the base station D2 constitutes a recording medium in accordance with the invention, readable by the processor D2_1 and on which is recorded a computer program PROG_D2 in accordance with the invention, including instructions for the execution of steps of the footprint determination method according to the invention. The program PROG_D2 defines functional modules of the base station D2, which is based on or control the hardware elements D2_1 to D2_5 of the base station D2 mentioned above, and which comprise in particular:

- a detection module MOD_DETEC_D2 configured to detect, for each location POS_i of the area Z at which the mapping terminal D1 emits the ambient signal, one or several transmitter devices T (i.e. these are the transmitter device(s) T illuminated by the mapping terminal D1 from said location POS_i, and whose generated backscattered signal(s) arrive, with a suitable power level, to the level of the base station D2, a determination module MOD_DET_D2 configured to determine, for each location POS_i of the area Z, the footprint EMP_i associated with said position POS_i.

The communication module D2_5 in particular allows the base station D2 to communicate with the mapping terminal D1, for example to exchange data via the wireless communication network.

In addition to the emitter D1 and receiver D2 devices, and as illustrated by FIG. 1, the navigation system 10 also includes a determination device D3 configured to carry out processing operations that allow determining the graph G, by implementing a method for determining said graph G. For the following description, the determination device is called "mapper".

FIG. 4 schematically represents an example of hardware architecture of the mapper D3 belonging to the navigation system 10 of FIG. 1.

As illustrated in FIG. 4, the mapper D3 has the hardware architecture of a computer. Thus, the mapper D3 in particular includes a processor D3_1, a random access memory D3_2, a read only memory D3_3 and a non-volatile memory D3_4. It further includes a communication module D3_5.

The read only memory D3_3 of the mapper D3 constitutes a recording medium in accordance with the invention, readable by the processor D3_1 and on which a computer program PROG_D3 in accordance with the invention is recorded, including instructions for the execution of steps of the method for determining the graph G according to the invention. The program PROG_D3 defines functional modules of the mapper D3, which are based on or control the hardware elements D3_1 to D3_5 of the mapper D3 mentioned above, and which comprise in particular:

- an obtaining module MOD_OBT_D3 configured to obtain the plurality of footprints EMP_1, . . . , EMP_P determined by the base station D2,
- a determination module MOD_DET_D3 configured to determine the graph G, the vertices of said graph G being formed of said plurality of footprints EMP_1, . . . , EMP_P (i.e. each footprint EMP_i represents a vertex of the graph G), two vertices of said graph G being connected by an edge if the footprints relating to said two vertices include at least one transmitter device T detected in common.

Thus, and said again otherwise, two vertices EMP_i, EMP_j (i and j being distinct indices) of the graph G are connected by an edge if there is an index k comprised between 1 and K (K being the number of transmitter devices situated in the area Z) such as:

$$EMP\_i(k)=EMP\_j(k)=1.$$

The communication module D3_5 in particular allows the mapper D3 to communicate with the base station D2, for example via the wireless communication network used for the ambient backscatter, to receive the footprints EMP_1, . . . , EMP_P determined by said base station D2. Said communication module D3_5 in particular integrates the obtaining module MOD_OBT_D3 (the communication module D2_5 equipping the base station D2 is therefore in this case configured to transmit said footprints EMP_1, . . . , EMP_P to the mapper D3).

Nothing, of course, excludes envisaging that the footprints EMP_1, . . . , EMP_P, once determined by the base station D2, are firstly transmitted to a device, called "other device", distinct from the mapper D3 and that, secondly, said mapper D3 obtains said footprints EMP_1, . . . , EMP_P from said other device. For example, said other device is a dedicated server including a database configured to store said footprints EMP_1, . . . , EMP_P.

In general, no limitation is attached to the way in which the mapper D3 can obtain the footprints EMP_1, . . . , EMP_P determined by the base station D2.

The method for emitting the ambient signal (executed by the mapping terminal D1), the method for determining the footprints EMP_1, . . . , EMP_P (executed by the base station D2) as well as the method for determining the graph G (executed by the mapper D3) are all three implemented during the execution of a general method, called "navigation preparation" method. Said navigation preparation method therefore groups together said emission method, method for determining footprints and method for determining the graph G, and includes, in particular, the processing operations implemented by the navigation system 10 during said navigation preparation phase.

Figure 5:
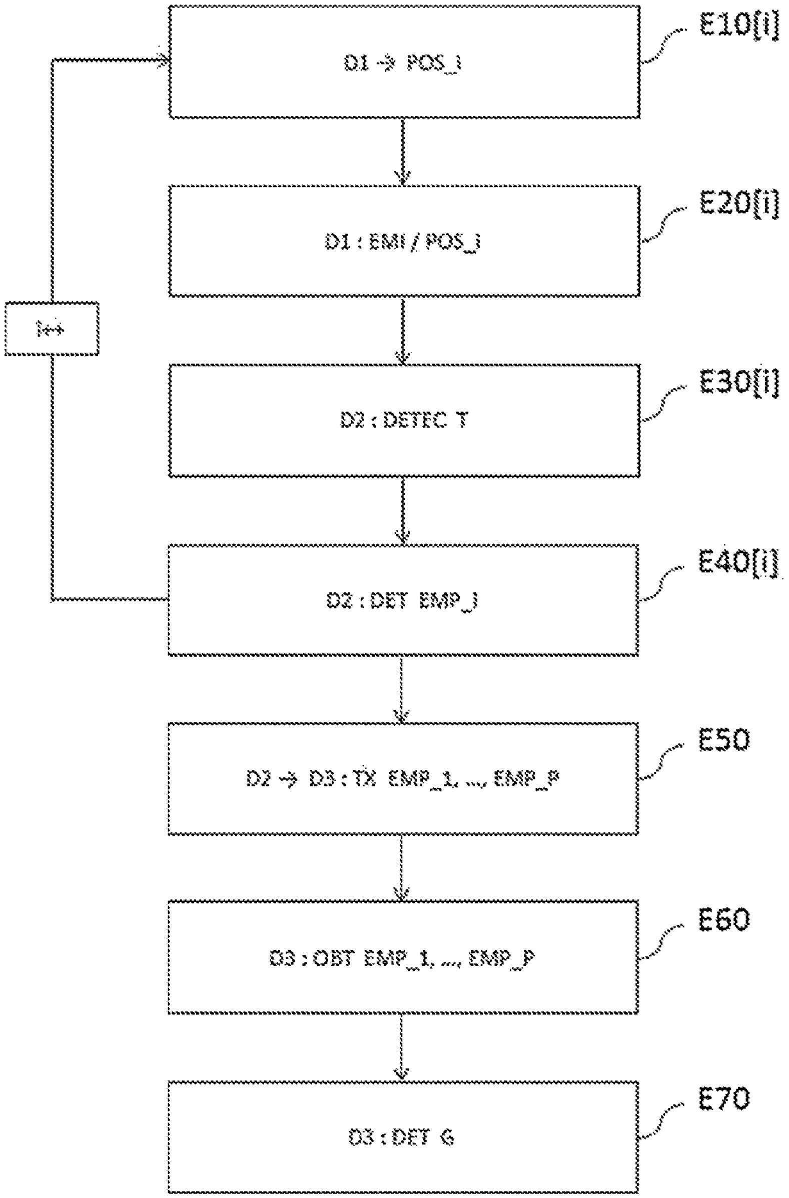
FIG. 5 represents, in the form of a flowchart, one particular navigation preparation method as it is implemented, at least partly, by the devices of FIGS. 2, 3 and 4.

FIG. 5 represents, in the form of a flowchart, one particular embodiment of the navigation preparation method, as it is implemented, at least partly, by the mapping terminal D1 of FIG. 2, the base station D2 of FIG. 3 and the mapper D3 of FIG. 4.

As illustrated in FIG. 5, the navigation preparation method includes, for each location POS_i of the area Z, a step E10[*i*] of moving the mapping terminal D1 so as to reach said location POS_i.

This step E10[*i*] belongs to the emission method and is carried out thanks to the user U1 in possession of the mapping terminal D1. For example, a map representative of the area Z as well as at least the location POS_i (all the locations POS_1, . . . , POS_P that can be displayed at once, or in turns progressively with the movements of the user U1) are displayed, thanks to display means configured for this purpose, on a screen equipping the mapping terminal D1.

Consequently, the user U1 can go to said location POS_i by consulting his screen, the position of said user U1 further being displayed on said screen.

Alternatively, or in combination with the previous example, said location POS_i can correspond to a remarkable location of the area Z. The user U1 is then able to reach the location POS_i from only a description of said location POS_i, so that it is unnecessary for it to be indicated on a map displayed on the screen of the mapping terminal D1. By "remarkable place", reference is made here to a place that can be easily distinguished within the area Z insofar as no other place of the area Z looks like it.

Said navigation preparation method further includes, for each location POS_i of the area Z, a step E20[*i*] of emitting said ambient signal when said location POS_i is reached. Said step E20[*i*] belongs to the emission method and is implemented by the emission module MOD_EMI_D1 equipping the mapping terminal D1.

As illustrated in FIG. 5, the navigation preparation method includes, upon emission of he ambient signal (step E20[*i*]), a step E30[*i*] of detecting one or several transmitter devices T. Said step E30[*i*] belongs to the footprint determination method and is implemented by the detection module MOD_DETEC_D2 equipping the base station D2.

Subsequently, the navigation preparation method includes a step E40[*i*] of determining the footprint EMP_i associated with said location POS_i. Said step E40[*i*] belongs to the footprint determination method and is implemented by the determination module MOD_DET_D2 equipping the base station D2.

According to one exemplary implementation of said step E20[*i*], said ambient signal is emitted for a given duration.

Alternatively, said ambient signal is emitted as long as the number of transmitter devices T detected by the base station D2 is below a given threshold, the duration of emission of the ambient signal being further increased by a given time limit.

Steps E10[i], E20[i], E30[i] and E40[i] are iterated for each of the locations POS_1, . . . , POS_P, so that at the end of said iterations, the base station D2 has determined the P footprints EMP_1, . . . , EMP_P. Said footprints EMP_1, . . . , EMP_P are then transmitted to the mapper D3 during a step E50 implemented by the base station D2 by means of its communication module D2_5.

It should be noted that the order in which the locations POS_1, . . . , POS_P are reached by the user U1 of the mapping terminal D1 is not a limiting factor of the invention. By way of example, and in order to minimize the traveled distance, the user U1 can join the location that seems to him to be closest to him and that he has not yet visited.

The navigation preparation method also includes a step E60 of obtaining the footprints EMP_1, . . . , EMP_P. Said step E60 belongs to the method for determining the graph G and is implemented by the obtaining module MOD_OBT_D3 equipping the mapper D3.

In practice, said obtaining step corresponds to receipt of the footprints EMP_1, . . . , EMP_P transmitted by the base station D2.

Then, the navigation preparation method includes a step E70 of determining the graph from the footprints EMP_1, . . . , EMP_P obtained. Said step E70 belongs to the method for determining the graph and is implemented by the determination module MOD_DET_D3 equipping the mapper D3.

Said step E70 includes particularly a sub-step (not represented in FIG. 5) of determining the transmitter devices T commonly belonging to two distinct footprints. The implementation of this sub-step is for example prformed by comparing, component by component, the vectors respectively representing the footprints.

One particular examplary implementation of the navigation preparation method of FIG. 5 is represented through four FIGS. 6A, 6B, 6C and 6D.

Said four FIGS. 6A, 6B, 6C and 6D can be seen as four sub-figures of the same figure, called "FIG. 6" below. In the example of FIG. 6, it is considered that the number of given locations of the area Z is equal to 12 (i.e. P=12).

Figure 6A:
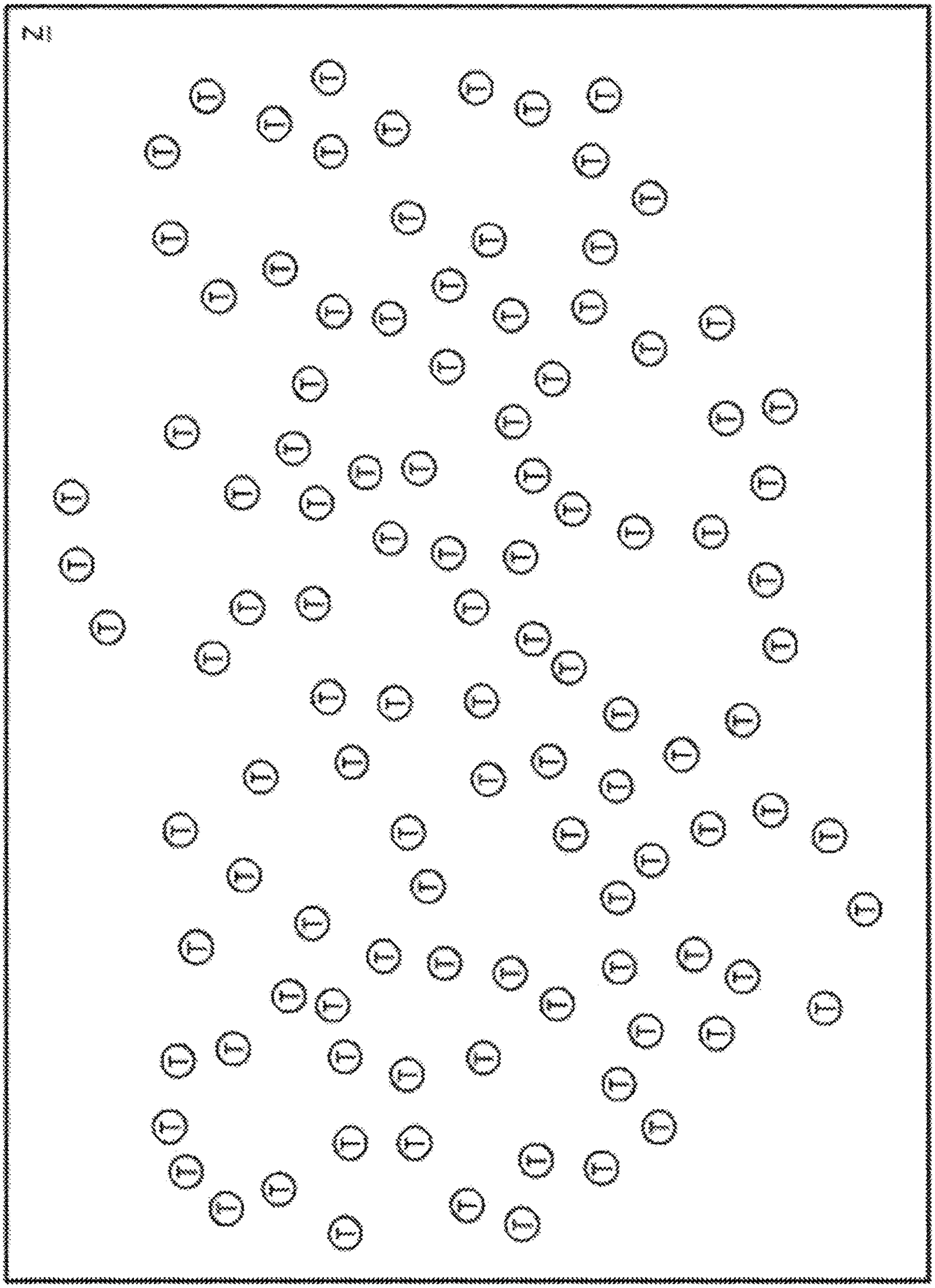
FIG. 6A schematically represents, for a particular examplary implementation of the navigation preparation method of FIG. 5, said geographical area as well as transmitter devices situated in said area.

Sub-FIG. 6A represents the area Z as well as the transmitter devices T situated in said area Z when the navigation preparation method begins (each transmitter device is represented in sub-FIG. 6A by means of a circle inside which the letter "T" is inscribed). In other words, at this time, no footprint and no graph have yet been determined.

It is noted that FIG. 6A is intended to be a simplified representation of the environment of the detection system 10. Particularly, the base station D2 and the mapper D3 are not represented therein.

Figure 6B:
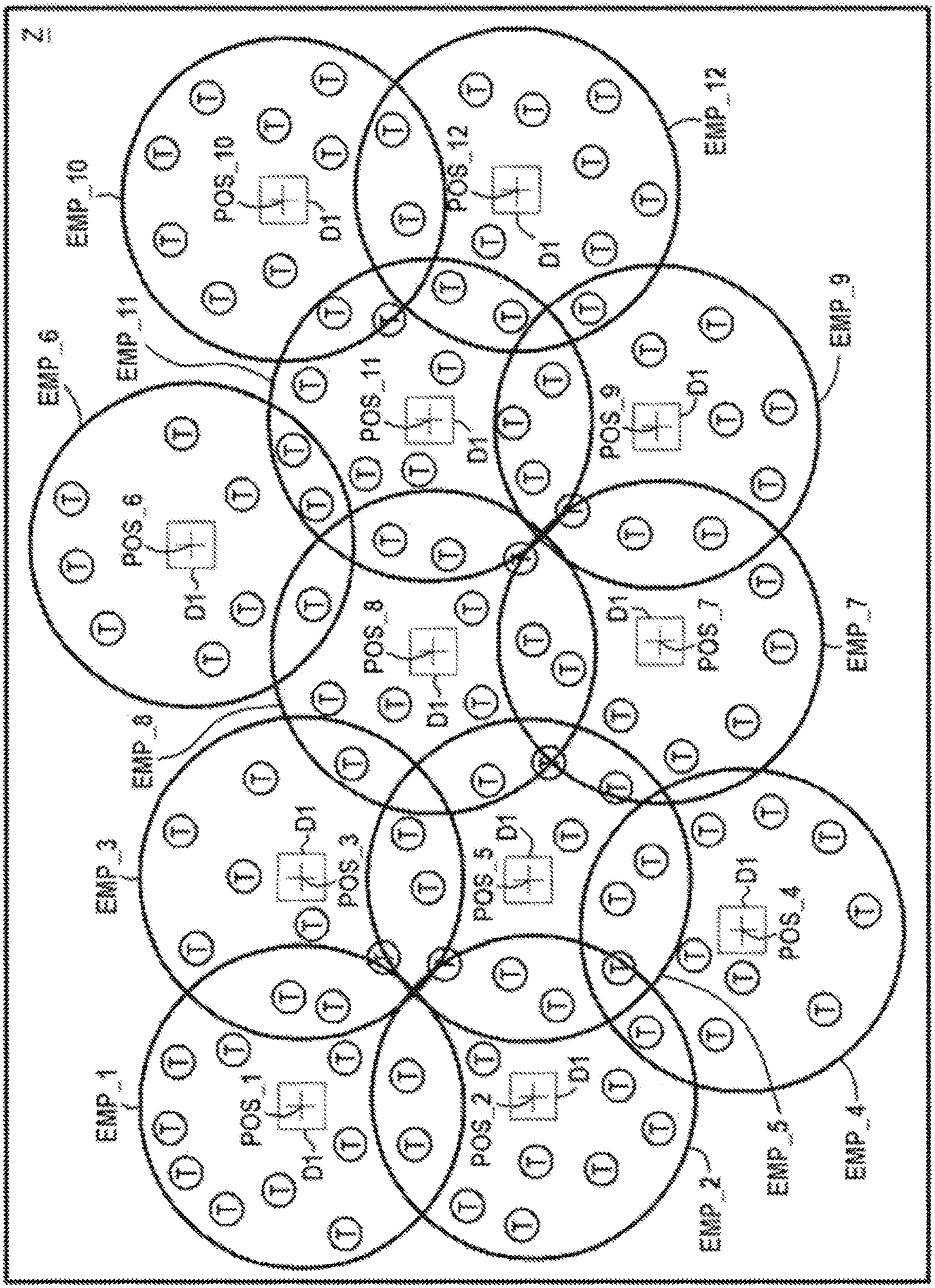
FIG. 6B corresponds to FIG. 6A in which are further represented different locations at which footprints of the area are determined.

Sub-FIG. 6B further represents, relative to sub-FIG. 6A, the different locations POS_1, . . . , POS_12. The mapping terminal D1 is also represented at each of these locations to mean that it moves in the area Z to reach said locations POS_1, . . . , POS_12.

Furthermore, the different footprints determined once steps E10[i], E20[i], E30[i] and E40[i] have been iterated are also represented symbolically in sub-FIG. 6B. Thus, each footprint EMP_i associated with a location POS_i is represented by means of a circle containing said location POS_i.

Figure 6C:
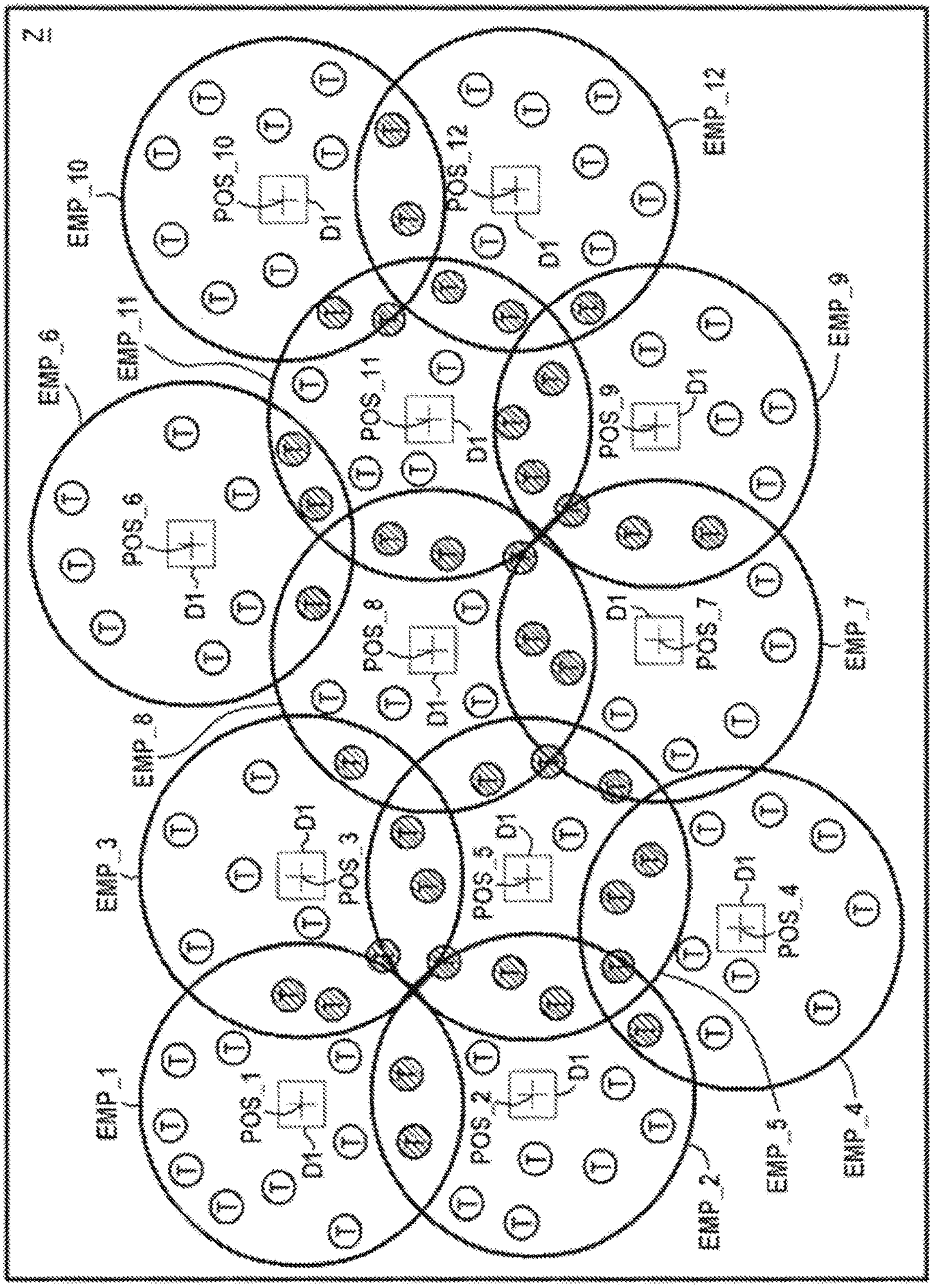
FIG. 6C corresponds to FIG. 6B in which are further represented transmitter devices commonly belonging to two distinct footprints.

Sub-FIG. 6C further represents, relative to sub-FIG. 6B, the transmitter devices T commonly belonging to two distinct footprints (hatched circles including the letter T).

Figure 6D:
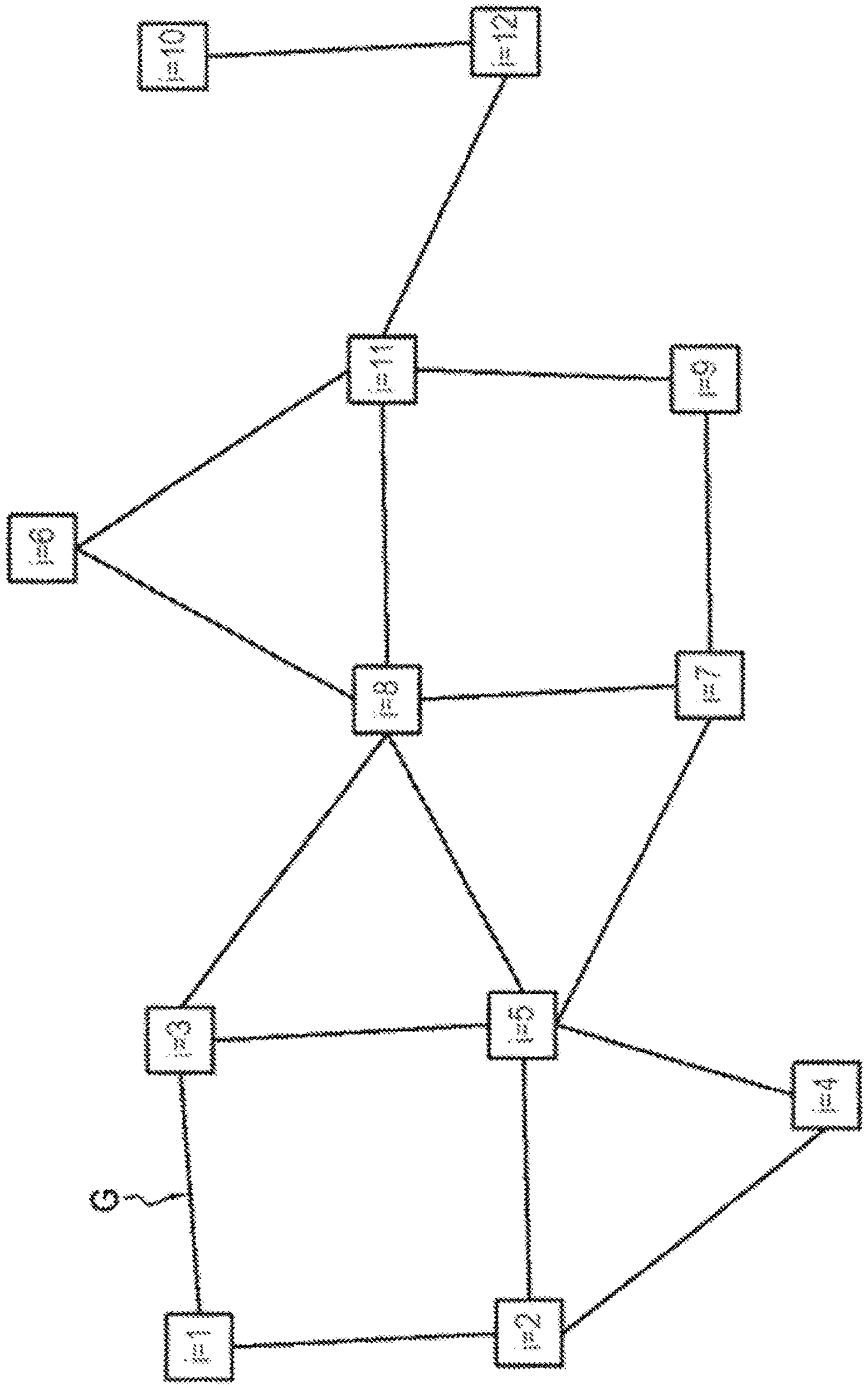
FIG. 6D represents a graph obtained at the end of the implementation of the navigation preparation method.

Finally, sub-FIG. 6D for its part represents the graph G finally obtained at the end of step E70. The vertices of the graph G are indicated only by means of the index "i" associated with the footprint EMP_i (as well as the position POS_i) attached to each vertex.

The aspects of the invention in connection with the processing operations carried out during the actual navigation phase in the area Z will now be described. Said navigation phase is based on the graph G determined during the navigation preparation phase.

In the context of said actual navigation phase, it is assumed that a user U2 of the navigation system 10 wishes to move in the area Z. It is noted that the user U2 wishing to move in the area Z can be either the same user U1 as the one described above as being in possession of the mapping terminal D1, or a distinct user.

In accordance with the invention, the user U2 wishes to reach, from a starting location POS_INI that he occupies, a given transmitter device, called target transmitter device "T_END", among the transmitter devices T situated in said area Z. In other words, the user wishes to navigate in the area Z to make a route allowing him to connect his starting location POS_INI to said target transmitter device T_END.

It should be noted that the starting location POS_INI may or may not correspond to one of the locations POS_1, . . . , POS_P used during the navigation preparation phase to determine the footprints EMP_1, . . . , EMP_P.

In its general principle, and with regard to said actual navigation phase, the navigation system 10 aims to indicate to the user U2 footprints EMP_i that he must successively join (it means reaching, for each footprint indicated to the user U2, a location satisfying a neighborhood criterion with some transmitter devices identified by said footprint) until finally reaching an arrival footprint identifying the transmitter device T_END. The location finally reached in association with such an arrival footprint constitutes, within the meaning of the invention, a neighborhood of said transmitter device T_END.

Once a location of said arrival footprint has been reached, it remains for the user U2 to move to definitively join the transmitter device T_END. To do so, and in accordance with the invention, each transmitter device T situated in the area Z is associated with one or several data, called "sensory data", making it possible to identify in a sensory manner said transmitter device T in the environment of said area Z. It is important to note that the sensory data associated with a transmitter device T differ from the data for identifying this same transmitter device T which is transmitted to the base station D2 by ambient backscatter of the ambient signal during the navigation preparation phase.

By way of non-limiting example, a sensory data associated with a transmitter device T corresponds to any one of the following elements:

- an image: logo, photo of said transmitter device T, photo of an object to which said transmitter device T is affixed, etc.;
- a video: video of said transmitter device T, video of an object to which said transmitter device T is affixed, etc.;
- a sound: particular sound associated with said transmitter device T, sound likely to be produced by an object to which the transmitter device T is affixed, etc.;

an alphanumeric identifier: number/name/visible brand of said transmitter device T, number/name/visible brand of an object to which said transmitter device T is affixed, etc.

No limitation is attached to the number and nature of the sensory data associated with a transmitter device T. Thus, a transmitter device T can be associated with a single sensory data or with a plurality of sensory data of the same type (image, video, sound, etc.) but also of distinct respective types.

According to one exemplary embodiment, all or part of the sensory data respectively associated with the transmitter devices of the area Z is stored in storage means external to the devices belonging to the navigation system 10. Said storage means correspond for example to a server including a database to which the different devices belonging to the navigation system 10 can have access.

Alternatively or additionally to the previous exemplary embodiment, all or part of the sensory data respectively associated with the transmitter devices of the area Z is stored in storage means belonging to one or several devices of the navigation system 10.

In the embodiment illustrated in FIG. 1, the navigation system 10 also includes a device D4, distinct from the mapper D3, and configured to carry out processing operations making it possible to determine a path, called "intermediate path" PATH_INT, making it possible to connect the starting location POS_INI to a neighborhood of the transmitter device T_END, by implementing a method for determining said intermediate path PATH_INT. For the following description, the device D4 is called "tracker".

Figure 7:
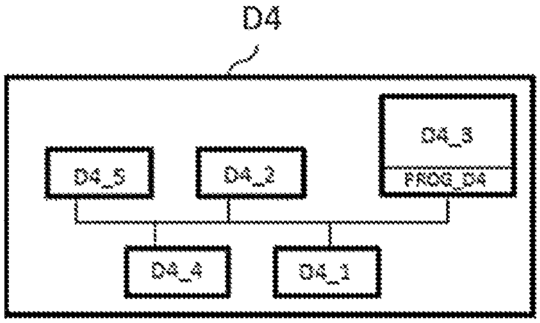
FIG. 7 schematically represents an example of hardware architecture of a device for determining an intermediate path belonging to the navigation system of FIG. 1.

FIG. 7 schematically represents an example of hardware architecture of the tracker D4 belonging to the navigation system 10 of FIG. 1.

As illustrated in FIG. 7, the tracker D4 has the hardware architecture of a computer. Thus, the tracker D4 includes, in particular, a processor D4_1, a random access memory D4_2, a read only memory D4_3 and a non-volatile memory D4_4. It also includes a communication module D4_5.

The read only memory D4_3 of the tracker D4 constitutes a recording medium in accordance with the invention, readable by the processor D4_1 and on which a computer program PROG_D4 in accordance with the invention is recorded, including instructions for the execution of steps of the method for determining said intermediate path PATH_INT according to the invention. The program PROG_D4 defines functional modules of the tracker D4, which are based on or control the hardware elements D4_1 to D4_5 of the tracker D4 mentioned above, and which comprise in particular:

- a first obtaining module MOD_OBT1_D4 configured to obtain the graph G determined by the mapper D3 during the navigation preparation phase,
- a second obtaining module MOD_OBT2_D4 configured to obtain a footprint, called "current footprint" EMP_CUR, determined for said starting location POS_INI by the base station D2,
- a test module MOD_TEST_D4 configured to verify whether said current footprint EMP_CUR forms or does not form a vertex of the graph G,
- an update module MOD_UPD_D4 configured to update, if said current footprint EMP_CUR does not form a vertex of the graph G, the graph G so that the current footprint forms a vertex of the updated graph G_NEW, two vertices of said updated graph G_NEW being connected by an edge if the footprints relating to said two vertices include at least one transmitter device T detected in common (i.e. the rule for creating an edge in the updated graph G_NEW is identical to the one considered for the graph G),
- a determination module MOD_DET_D4 configured to determine a sequence SEQ of footprints of the graph updated when appropriate, said sequence SEQ forming said intermediate path PATH_INT so that said intermediate path PATH_INT is of minimum length to connect the starting location POS_INI to a footprint (of the graph updated when appropriate) identifying the transmitter device T_END.

The communication module D4_5 in particular allows the tracker D4 to communicate with the mapper D3 as well as with the base station D2, for example to exchange data via the wireless communication network. Said communication module D4_5 in particular integrates the first obtaining module MOD_OBT1_D4 and the second obtaining module MOD_OBT2_D4.

The determination of a path of minimum length in a graph involves algorithmic techniques known to those skilled in the art, and commonly grouped under the name "traveling salesman problem". In general, any algorithm for determining a path of minimum length in a graph can be envisaged, and the choice of a particular algorithm only constitutes one variant of implementation of the invention. For example, the intermediate path is determined using the Dijkstra algorithm. Alternatively, other algorithms can be implemented, such as for example an algorithm of the Bellman-Ford Moore type or of the Roy-Warshall-Floyd type.

It is noted that the intermediate path PATH_INT corresponds to a sequence SEQ of footprints. There is therefore an order relation between the footprints of said sequence SEQ so that it is possible to refer to the "first footprint" of said sequence SEQ. More particularly, said order relation allows defining the order in which the footprints of the sequence SEQ are classified, it being understood that by following this order it is possible to connect the starting location POS_INI to a footprint identifying the transmitter device T_END.

Within the meaning of the present invention, the convention is adopted according to which the updated graph G_NEW corresponds to the graph G if said current footprint EMP_CUR already forms a footprint of said graph G (which corresponds to the case where the initial location POS_INI is sufficiently close, or even identical, to one of the locations POS_1, . . . , POS_P).

To make his route, and as illustrated in FIG. 1, the user U2 is in possession of a device D5 belonging to the navigation system 10.

In the present embodiment, the device D5 is distinct from the mapping terminal D1 and corresponds to a mobile terminal of the cellular telephone type, for example a smartphone. It should however be noted that, similarly to what has been described for the mapping terminal D1, no limitation is attached to the form taken by the device D5 provided that the latter is configured to emit an ambient signal in an emission band identical to the one used by the mapping terminal D1, as well as to carry out processing operations allowing the user in possession of said terminal D5 to navigate in the area Z, by implementing steps of a moving method according to the invention. For the following description, the terminal D5 is called "localization terminal".

Figure 8:
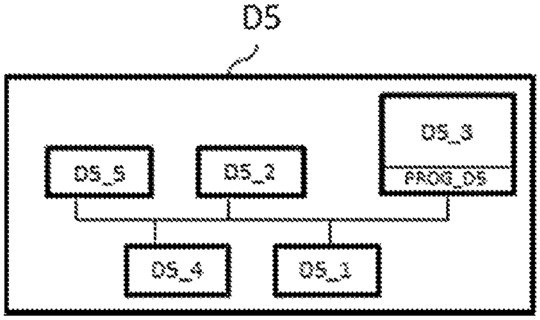
FIG. 8 schematically represents an example of hardware architecture of another device for emitting an ambent signal belonging to the navigation system of FIG. 1.

FIG. 8 schematically represents an example of hardware architecture of the localization terminal D5 belonging to the navigation system 10 of FIG. 1, and in possession of the user U2.

As illustrated in FIG. 8, the localization terminal D5 has the hardware architecture of a computer. Thus, the localization terminal D5 includes, in particular, a processor D5_1, a random access memory D5_2, a read only memory D5_3 and a non-volatile memory D5_4. It also includes a communication module D5_5.

The read only memory D5_3 of the localization terminal D5 constitutes a recording medium in accordance with the invention, readable by the processor D5_1 and on which a computer program PROG_D5 in accordance with the invention is recorded, including instructions for the execution of steps of the moving method according to the invention. The program PROG_D5_1 defines functional modules of the localization terminal D5, which are based on or control the hardware elements D5_1 to D5_5 of the localization terminal D5 mentioned above, and which comprise in particular:

an emission module MOD_EMI_D5 configured to emit the ambient signal at said starting location POS_INI, a first obtaining module MOD_OBT1_D5 configured to obtain said current footprint EMP_CUR, determined for said starting location POS_INI by the base station D2, a second obtaining module MOD_OBT2_D5 configured to obtain the first footprint EMP_PATH_INT_1 of the intermediate path PATH_INT determined by the tracker D4, a third obtaining module MOD_OBT3_D5 configured to obtain one or several sensory data making it possible to identify a set of transmitter devices, called "locating set" E_REP, formed of the transmitter device(s) identified by said first footprint EMP_PATH_INT_1 and not identified by said current footprint EMP_CUR.

The communication module D5_5 in particular allows the localization terminal D5 to communicate with the base station D2 as well as with the tracker D4, for example to exchange data via the wireless communication network. Said communication module D5_5 in particular integrates the first obtaining module MOD_OBT1_D5, the second obtaining module MOD_OBT2_D5 and the third obtaining module MOD_OBT3_D5.

For the following description, it is considered without limitation that the sensory data respectively associated with the transmitter devices T present in the area Z are stored in a server (not representeed in the figures) external to the localization terminal D5. Consequently, the third obtaining module MOD_OBT3_D5 is more particularly configured to receive from said server the sensory data or data associated with said locating set E_REP, for example after having emitted an appropriate request to said server. It should however be noted that it remains possible to envisage, as mentioned previously, that the sensory data are stored in the storage means of one or several devices of the navigation system 10, such as for example in the non-volatile memory D5_4 of the localization terminal D5.

In the present embodiment, the localization terminal D5 includes a screen (it is the screen of the smartphone here), as well as display means configured to display on said screen one or several transmitter devices T of the area Z. Said display means are in particular configured to implement a man-machine interface making it possible to display on the screen one or several images respectively associated with the transmitter devices T. In this way, the user U2 can for example take note of images associated with transmitter devices belonging to a selection among all the transmitter devices T of the area Z.

In the embodiment of FIG. 1, the navigation system 10 still includes another determination device D6 distinct from the determination devices D3 and D4, and configured to carry out processing operations for determining a location, called "intermediate location" POS_INT, allowing to connect the starting location POS_INI to a neighborhood of the transmitter device T_END, by implementing a method for determining said intermediate location POS_INT. For the following description, the determination device D6 is called "stopper".

The processing operations that can be carried out by the stopper D6 in particular include processing operations aimed at decoding, following the emission of the ambient signal by the localization terminal D5, the signals backscattered by the transmitter devices T, so as to obtain the respective identification data of said transmitter devices T. Each identification data is obtained by implementing a decoding method (not represented in the figures) similar to the one implemented by the base station D2. Consequently, and at least with regard to the aspects related to the decoding of the backscattered signals, the stopper D6 includes a set of means configured by software (specific computer program) and/or hardware (FPGA, PLD, ASIC, etc.) similar to those equipping the base station D2, to implement the decoding method.

Figure 9:
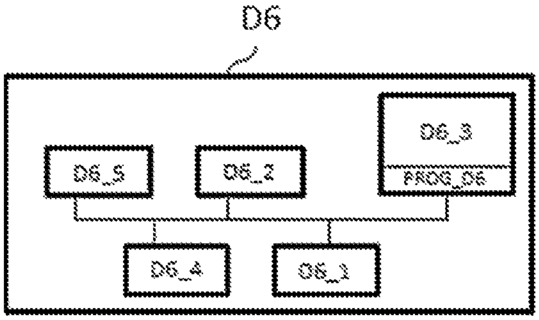
FIG. 9 schematically represents an example of hardware architecture of a device for determining an intermediate location belonging to the navigation system 10 of FIG. 1.

FIG. 9 schematically represents an example of hardware architecture of the stopper D6 belonging to the navigation system 10 of FIG. 1.

As illustrated in FIG. 9, the stopper D6 has the hardware architecture of a computer. Thus, the stopper D6 includes, in particular, a processor D6_1, a random access memory D6_2, a read only memory D6_3 and a non-volatile memory D6_4. It further includes a communication module D6_5.

The read only memory D6_3 of the stopper D6 constitutes a recording medium in accordance with the invention, readable by the processor D6_1 and on which a computer program PROG_D6 in accordance with the invention is recorded, including instructions for the execution of steps of the method for determining said intermediate location POS_INT according to the invention. The program PROG_D6 defines functional modules of the stopper D6, which are based on or control the hardware elements D6_1 to D6_5 of the stopper D6 mentioned above, and which comprise in particular:

a first obtaining module MOD_OBT1_D6 configured to obtain the current footprint EMP_CUR, determined for said starting location POS_INI by the base station D2, a second obtaining module MOD_OBT2_D6 configured to obtain the first footprint EMP_PATH_INT_1 of the intermediate path PATH_INT determined by the tracker D4, a detection module MOD_DETEC_D6 configured to detect, when the localization terminal D5 moves in the area Z by emitting the ambient signal, one or several transmitter devices T, a determination module MOD_DET_D6 configured to determine, when the localization terminal D5 moves in the area Z by emitting the ambient signal, a location called "intermediate location" POS_INT satisfying a neighborhood criterion CRIT_V making it possible to verify whether the localization terminal D5 has reached a location for which the stopper D6 detects, from the ambient signal emitted by said location terminal D5, a number of transmitter devices at least equal to a given fraction of the number of transmitter devices belonging to a set of transmitter devices, called "locating set" E_REP, formed of the transmitter device(s) identified by said first footprint EMP_PATH_INT_1 and not identified by said current footprint EMP_CUR, a reansmission module MOD_TX_D6 configured to transmit to the localization terminal D5 an information data INFO able to indicate that the intermediate location POS_INT is reached.

The communication module D6_5 in particular allows the stopper D6 to communicate with the base station D2 as well as with the tracker D4, for example to exchange data via the wireless communication network. Said communication module D6_5 in particular integrates the first obtaining module MOD_OBT1_D6 and the second obtaining module MOD_OBT2_D6.

Thus, the localization terminal D5 is in particular intended to move in the area (thanks to the user U2) so as to reach said intermediate location POS_INT determined by the stopper D6.

Such movement is performed by using the sensory data associated with the locating set E_REP, as described in more detail later.

No limitation is attached to the nature of said information data INFO since it allows the user U2 to be informed that he has reached the intermediate location POS_INT. For example, said information data INFO is configured to generate, once received by the localization terminal D5, an audible alarm played by sound means equipping the localization terminal D5 or to display an alert message on the screen of said localization terminal D5.

No limitation is attached to the value of the fraction considered for the neighborhood criterion CRIT_V either. For example, said fraction is at least equal to 50%.

The method for determining the intermediate path PATH_INT (executed by the tracker D4), the method for moving in the area Z (executed by the localization terminal D5) as well as the method for determining an intermediate location POS_INT (executed by the stopper D6) are all three implemented during the execution of a general method, called "navigation method". Said navigation method therefore groups together said methods for determining the intermediate path PATH_INT, for moving in the area Z and for determining an intermediate location POS_INT, and includes in particular the processing operations implemented by the navigation system 10 during said actual navigation phase.

For the following description, and for the purpose of simplifying it only, it is now considered without limitation that the sensory data are all images representing, in the environment of the area Z, objects to which the transmitter devices T are respectively affixed. It is further considered without limitation that each transmitter device T is associated with a single sensory data (image) DATA_IMA.

Figure 10:
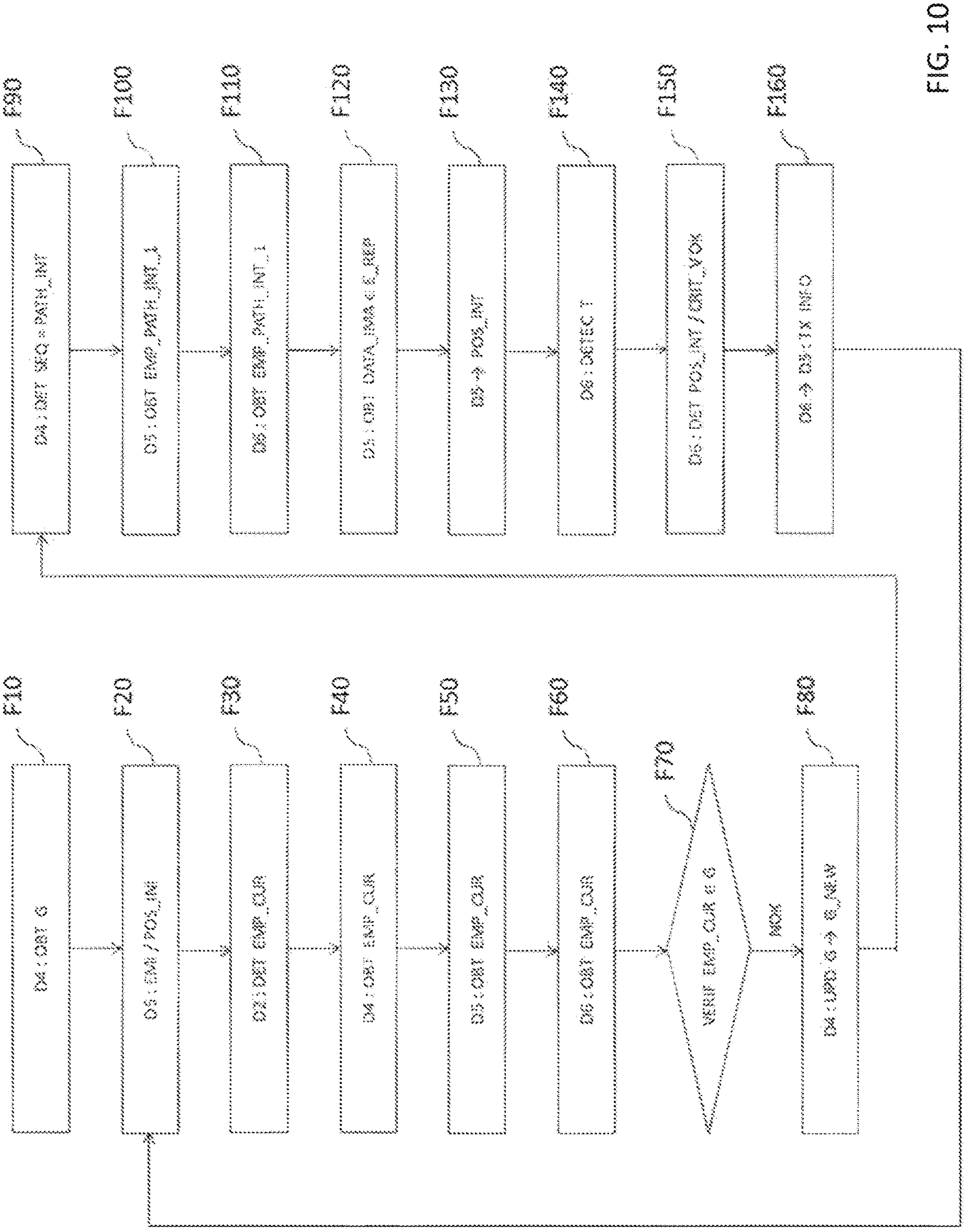
FIG. 10 represents, in the form of a flowchart, one particular embodiment of a navigation method according to the invention as it is implemented, at least partly, by the devices of FIGS. 7, 8 and 9.

FIG. 10 represents, in the form of a flowchart, one particular embodiment of the navigation method according to the invention, as implemented, at least partly, by the tracker D4 of FIG. 7 and the localization terminal D5 of FIG. 8 and the stopper D6 of FIG. 9.

As illustrated by FIG. 10, the navigation method firstly includes a step F10 of obtaining the graph G. Said step F10 belongs to the method for determining the intermediate path PATH_INT and is implemented by the first obtaining module MOD_OBT1_D4 equipping the tracker D4 (the graph G is transmitted by the mapper D3 to the tracker D4).

The navigation method also includes a step F20 of emitting, by the localization terminal D5, the ambient signal at said starting location POS_INI. Said step F20 belongs to the method for moving in the area Z and is implemented by the emission module MOD_EMI_D5 equipping the localization terminal D5.

The navigation method includes, following step F20 of emitting the ambient signal, a step F30 of determining a current footprint EMP_CUR associated with the starting location POS_INI.

Said step F30 is implemented by the base station D2, in accordance with the footprint determination method able to be executed by the base station D2.

The navigation method then includes a plurality of steps of obtaining the current footprint EMP_CUR, namely:

- a step F40 of obtaining said current footprint EMP_CUR by the tracker D4. Said step F40 belongs to the method for determining the intermediate path PATH_INT and is implemented by the second obtaining module MOD_OBT2_D4 equipping the tracker D4;
- a step F50 of obtaining said current footprint EMP_CUR by the localization terminal D5. Said step F50 belongs to the method for moving in the area Z and is implemented by the first obtaining module MOD_OBT1_D5 equipping the localization terminal D5;
- a step F60 of obtaining said current footprint EMP_CUR by the stopper D6. Said step F60 belongs to the method for determining the intermediate location POS_INT and is implemented by the first obtaining module MOD_OBT1_D6 equipping the stopper D6.

All or part of said steps F40, F50 and F60 can be implemented sequentially or in parallel, this aspect not being limiting for the invention. It is moreover noted that each obtaining step F40, F50 and F60 of course follows a transmission of the current footprint EMP_CUR by the base station to the concerned device.

The navigation method also includes a step F70 consisting in verifying whether said current footprint EMP_CUR forms or does not form a vertex of the graph G. Said step F70 belongs to the method for determining the intermediate path PATH_INT and is implemented by the test module MOD_TEST_D4 equipping the tracker D4.

For the following description of said mode of implementation, it is considered without limitation that the user U2 occupies a starting location POS_INI distinct from said locations POS_1, . . . , POS_P respectively associated with the footprints EMP_1, . . . , EMP_P. More specifically, it is considered that the starting location POS_INI is sufficiently far from each of the locations POS_1, . . . , POS_P for the current footprint EMP_CUR to be distinct from each of the footprints EMP_1, . . . , EMP_P. Consequently, the current footprint EMP_CUR does not form a vertex of the graph G.

The navigation method then includes a step F80 of updating the graph G so that the current footprint EMP_CUR forms a vertex of the updated graph G_NEW. Said step F80 belongs to the method for determining the intermediate path PATH_INT and is implemented by the update module MOD_UPD_D4 equipping the tracker D4.

The navigation method also includes a step F90 of determining a sequence SEQ of footprints of the updated graph G_NEW. Said sequence SEQ forms said intermediate path PATH_INT, so that said intermediate path PATH_INT is of minimum length to connect the starting location POS_INI to a footprint of the updated graph G_NEW identifying said transmitter device T_END. Said step F90 belongs to the method for determining the intermediate path PATH_INT and is implemented by the determination module MOD_DET_D4 equipping the tracker D4.

It should be noted that if it had been verified that the current footprint EMP_CUR already forms a vertex of the graph G, then the graph considered during the implementation of step F90 for the determination of the sequence SEQ would be the graph G itself, since no update would have taken place.

As illustrated in FIG. 10, the navigation method then includes a plurality of steps of obtaining the first footprint EMP_PATH_INT_1 belonging to the intermediate path PATH_INT, namely:

- a step F100 of obtaining said first footprint EMP_PATH_INT_1 by the localization terminal D5.

Said step F100 belongs to the method for moving in the area Z and is implemented by the second obtaining module MOD_OBT2_D5 equipping the localization terminal D5;

- a step F110 of obtaining said first footprint EMP_PATH_INT_1 by the stopper D6. Said step F110 belongs to the method for determining the intermediate location POS_INT and is implemented by the second obtaining module MOD_OBT2_D6 equipping the stopper D6.

All or part of said steps F100 and F110 can be implemented sequentially or in parallel, this aspect not being limiting for the invention.

The navigation method also includes a step F120 of obtaining the image(s) DATA_IMA making it possible to identify in a sensory manner, in the environment of the area Z, the transmitter device(s) T belonging to the locating set E_REP which is formed of the transmitter device(s) identified by said first footprint EMP_PATH_INT_1 and not identified by said current footprint EMP_CUR. Said step F120 belongs to the method for moving in the area Z and is implemented by the third obtaining module MOD_OBT3_D5 equipping the localization terminal D5.

In the present mode of implementation, said step F120 includes a sub-step of determining, by the localization terminal D5, said locating set E_REP. In this example, said determination sub-step is implemented by a dedicated module (not represented in the figures) equipping the localization terminal D5, this dedicated module possibly being for example a sub-module of the obtaining module MOD_OBT3_D5.

With regard to the representation in the form of a vector considered for a footprint, the determination of the locating set E_REP consists in performing a subtraction between the vectors respectively representative of the first footprint EMP_PATH_INT_1 and of the current footprint EMP_CUR.

As illustrated by FIG. 10, the navigation method then includes a step F130 of moving the localization terminal D5 in the area Z so as to reach the intermediate location POS_INT satisfying the neighborhood criterion CRIT_V, said movement being performed by using the image(s) DATA_IMA obtained during step F120 as well as by emitting the ambient signal. Said step F130 belongs to the method for moving in the area Z and is carried out thanks to the user U2 in possession of the localization terminal D5. More specifically, the user U2 uses the image(s) DATA_IMA displayed on the screen of the localization terminal D5 to orient himself in the area Z.

The navigation method also includes a step F140 of detecting, by the stopper D6, one or several transmitter devices, when the localization terminal D5 moves by emitting the ambient signal in accordance with step F130. Said step F140 belongs to the method for determining the intermediate location POS_INT and is implemented by the detection module MOD_DETEC_D6 equipping the stopper D6.

The navigation method also includes a step F150 of determining the intermediate location POS_INT satisfying the neighborhood criterion CRIT_V, when the localization terminal D5 moves by emitting the ambient signal in accordance with step F130. Said step F150 belongs to the method for determining the intermediate location POS_INT and is implemented by the determination module MOD_DET_D6 equipping the stopper D6.

Similarly to what has been described for step F120, said step F150 includes, in the present mode of implementation, a sub-step of determining, by the stopper D6, said locating set E_REP. In this example, said determination sub-step is implemented by a dedicated module (not represented in the figures) equipping the stopper D6, this dedicated module possibly being for example a sub-module of the determination module MOD_DET_D6.

Moreover, the navigation method includes a step F160 of transmitting to the localization terminal D5 an information data INFO able to indicate that the intermediate location POS_INT is reached. Said step F160 belongs to the method for determining the intermediate location POS_INT and is implemented by the transmission module MOD_TX_D6 equipping the stopper D6.

In accordance with the invention, steps F20 to F160 form a set of steps which is iterated as long as the first footprint EMP_PATH_INT_1 of the intermediate path PATH_INT does not identify said target transmitter device T_END (it is noted that step F10 does not need to be iterated insofar as it suffices that the graph G determined during the navigation preparation phase is obtained only once by the tracker D4).

Furthermore, for the implementation of the iterations of said set of steps F20 to F160, the starting location POS_INI considered in an iteration of said set of steps corresponds to the intermediate location POS_INT considered in the previous iteration. In other words, in the present mode of implementation, when the user U2 moves to reach an intermediate location POS_INT during an implementation of said set of steps F20 to F160, said intermediate location POS_INT becomes a starting location POS_INI for the next iteration of said set of steps F20 to F160.

Finally, still with regard to the implementation of said iterations, the graph considered in an iteration of said set of steps F20 to F160 for a possible update corresponds to the graph to which the intermediate path determined during the previous iteration belongs.

As mentioned above, once the user U2 has reached an intermediate location associated with a footprint identifying the target transmitter device T_END, said intermediate location constitutes an arrival location of the user U2. Consequently, the user U2 is able to reach the target transmitter device T_END, an image of which is accessible to him.

It should be noted that the navigation method has been described so far by considering that the localization terminal D5 and the stopper D6 each determine the locating set E_REP from the first footprint EMP_PATH_INT_1 and from the current footprint EMP_CUR they have each received. However, nothing excludes envisaging other modes of implementation in which the locating set E_REP is determined by a device other than the localization terminal D5 and the stopper D6, then is transmitted to said localization terminal D5 and to said stopper D6.

For example, said other device is the tracker D4 (which is also in possession of the first footprint EMP_PATH_INT_1 and of the current footprint EMP_CUR) or a device distinct from the devices D1 to D6. Furthermore, in this example, the localization terminal D5 (respectively the stopper D6) includes an obtaining module MOD_OBT_D5 (respectively MOD_OBT_D6) configured to obtain (receive) the locating set E_RE.

It is noted that in the case where the localization terminal D5 (respectively the stopper D6) determines the locating set E_REP, it is of course also possible to envisage that it is equipped with an obtaining module MOD_OBT_D5 (respectively MOD_OBT_D6) including, as sub-modules, the first obtaining module MOD_OBT1_D5 and the second obtaining module MOD_OBT2_D5 described above (respectively the first obtaining module MOD_OBT1_D6 and the second obtaining module MOD_OBT2_D6 described above). The module MOD_OBT_D5 (respectively MOD_OBT_D6) meeting such provisions is the one represented in FIG. 1 without limitation.

In general, no limitation is attached to the way in which the locating set E_REP is obtained by the localization terminal D5 and the stopper D6 as soon as they obtain said locating set E_REP.

Figure 11A:
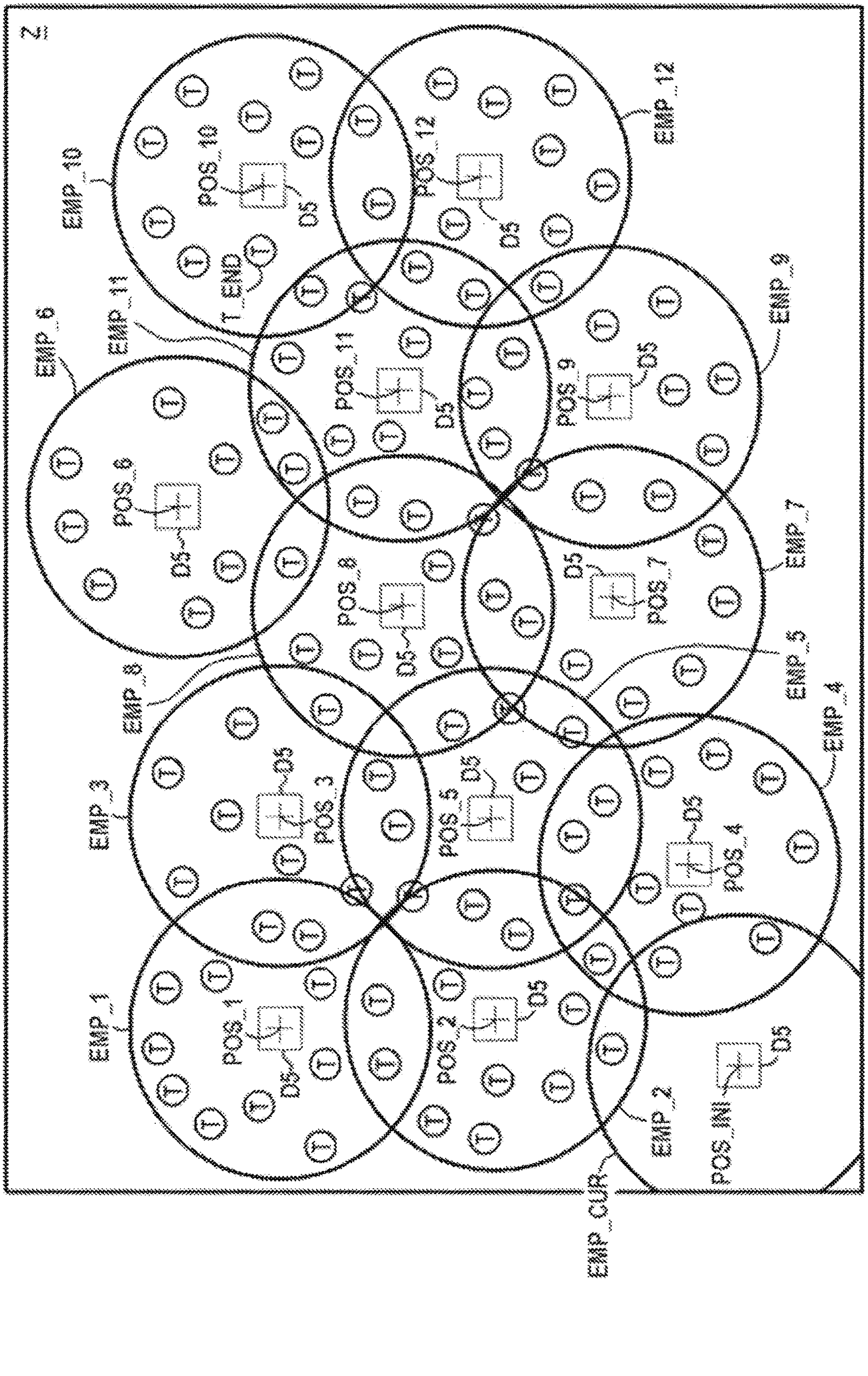
FIG. 11A corresponds to FIG. 6B in which is further represented a device intended to navigate in said area in accordance with the navigation method of FIG. 10.
Figure 11B:
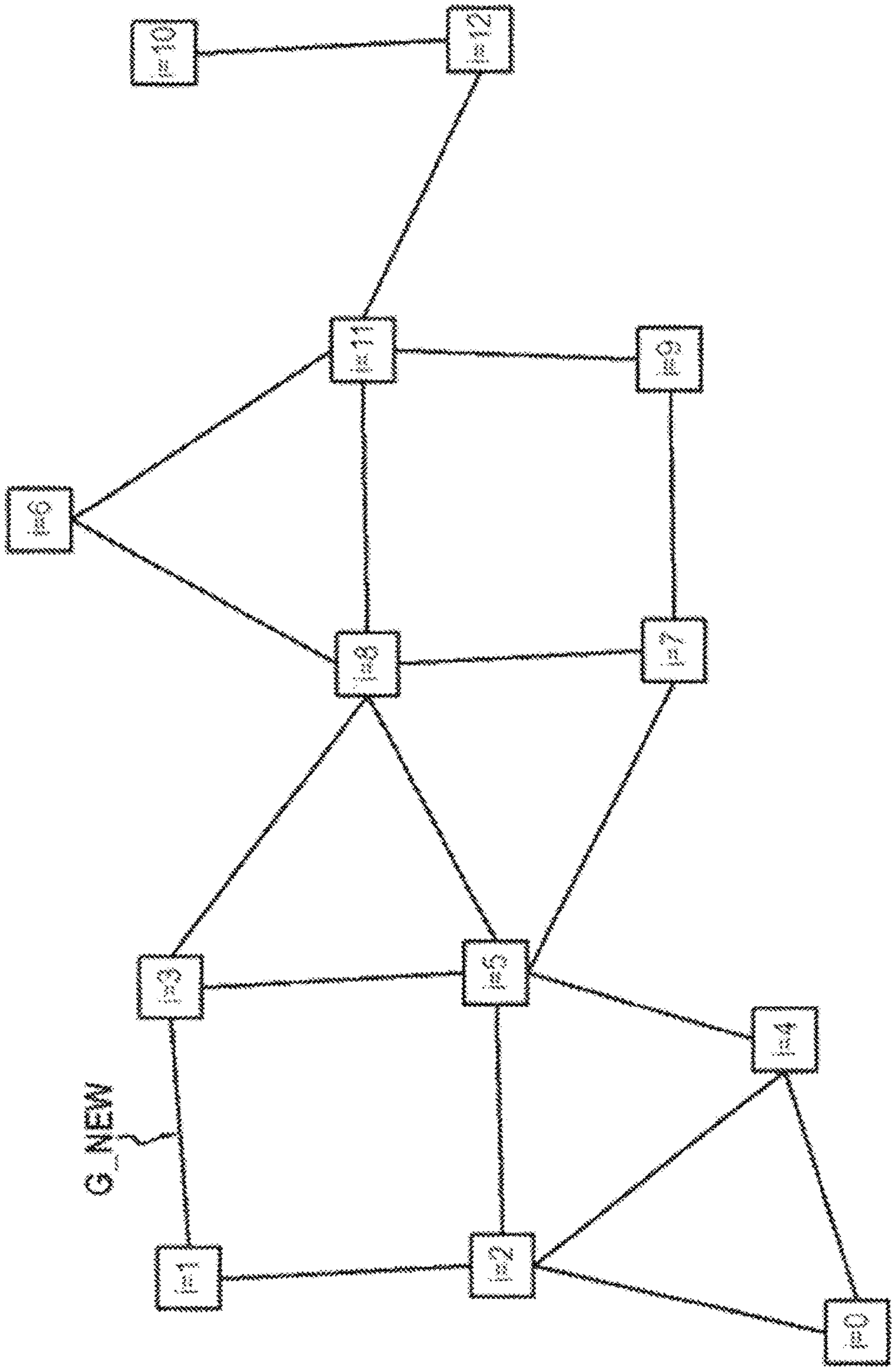
FIG. 11B corresponds to the graph of FIG. 6D after this graph has been updated in accordance with the navigation method of FIG. 10.
Figure 11C:
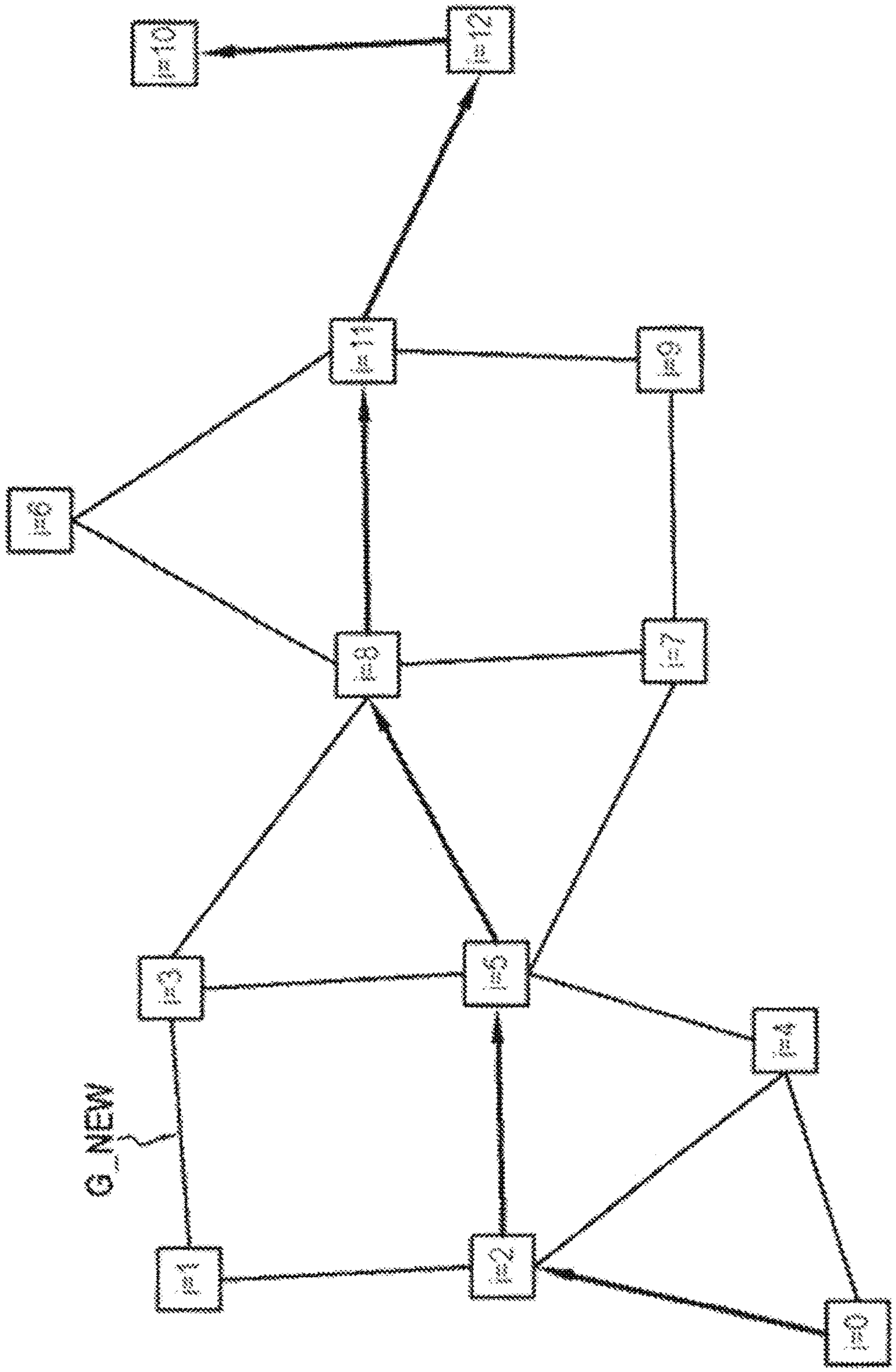
FIG. 11C represents a path of the graph of FIG. 11B, this path being determined in accordance with the navigation method of FIG. 10 and making it possible to navigate in the geographical area to join a target location from said initial location.

One particular examplary implementation of the navigation method of FIG. 10 is represented through three FIGS. 11A, 11B and 11C.

Said three FIGS. 11A, 11B and 11C can be seen as three sub-figures of the same figure, called "FIG. 11" below. FIG. 11 uses the configuration (area Z, number and positions of the transmitter devices T, number of given locations of the area Z equal to 12) of the environment of the navigation system 10 as illustrated in FIG. 6. Thus, the example of FIG. 11 follows the example of FIG. 6, the navigation in the area Z being based on the graph G represented in FIG. 6D.

Sub-FIG. 11A represents (relative to sub-FIG. 6B) the localization terminal D5 when the latter is positioned at the starting location POS_INI. It is noted that the starting location of sub-FIG. 11A designates the position of the user U2 before the navigation method begins.

Sub-FIG. 11A also represents:

- the current footprint EMP_CUR associated with said starting location POS_INI. Said current footprint EMP_CUR is determined by the base station D2 following the emission of the ambient signal by the localization terminal D5 positioned at the starting location POS_INI;
- the target transmitter device T_END that the user U2 wishes to reach. As illustrated by sub-FIG. 11A, said target transmitter device T_END is only identified by the footprint EMP_10.

As illustrated in sub-FIG. 11A, the starting location POS_INI differs from the locations POS_1, . . . , POS_12. More particularly, in this examplary implementation, said starting location POS_INI differs sufficiently from said locations POS_1, . . . , POS_12 for the current footprint EMP_CUR not to form a vertex of the graph G. Consequently, and in accordance with the navigation method, said current footprint EMP_CUR should be added to the graph G to make a new vertex therefrom and thus obtain the updated graph G_NEW.

Sub-FIG. 11B further represents, relative to sub-FIG. 6D, the updated graph G_NEW after the current footprint EMP_CUR (index i=0 in the graph H_NEW) has been added as a new vertex. As illustrated by sub-FIG. 11B, the current footprint EMP_CUR is connected by an edge to the only footprints EMP_2 (i=2) and EMP_4 (i=4). This results from the fact that the current footprint EMP_CUR identifies a transmitter device common to the footprint EMP_2 and two transmitter devices common to the footprint EMP_4.

In the example of FIG. 11, the algorithm used to determine an intermediate path in the graph G_NEW, in accordance with step F90 of the navigation method, is the Dijkstra algorithm. To describe how this algorithm is executed during the first implementation of the set of steps F20 to F160, the following notations and conventions are first introduced:

- E_V designates an initialized set as the empty set;
- L_DEST designates a set formed of the footprints of the graph G_NEW identifying the target transmitter device T_END. In the present exemplary implementation, we have: L_DEST={EMP_10};
- the notion of weight W between two vertices of the graph G_NEW is introduced. More specifically, the weight W(EMP_i, EMP_j) associated with two vertices EMP_i, EMP_j of the graph G_NEW is equal to 1 if these two vertices EMP_i, EMP_j are connected to each other by a single edge. If, on the other hand, these two vertices EMP_i, EMP_j are not connected to each other by a single edge, the weight W(EMP_i, EMP_j) associated therewith is considered to be infinite. In practice, for the computer implementation of the invention, it is considered that the weight W(EMP_i, EMP_j) of two vertices EMP_i, EMP_j not connected to each other by a single edge is set equal to a very large number, for example $10^6$ (one million);
- the notion of distance coefficient C_DIST(EMP_i) associated with a vertex EMP_i of the graph G_NEW is introduced. More specifically, the coefficient C_DIST (EMP_i) is equal to 0 if EMP_i is associated with the starting location POS_INI. If, on the other hand, EMP_i is associated with a location other than POS_INI, the coefficient C_DIST(EMP_i) is initialized to infinity. In practice, considerations identical to those mentioned for the case where the weight W(EMP_i, EMP_j) is infinite are considered here. Particularly, it is considered that the number assigned to an infinite distance coefficient is identical to the one used in the case of an infinite weight (for example $10^6$).

The implementation of step F90 is performed as long as there is a vertex of the graph G_NEW that does not belong to the set E_V.

Thus, in the present case, step F90 begins with a determination (sub-step F90_1), among the vertices of the graph G_NEW that do not belong to the set E_V (therefore in this case all the vertices of the graph G_NEW given that E_V is initialized to the empty set), of a vertex of the graph G_NEW whose distance coefficient is minimal. Consequently, the vertex of the graph G_NEW thus determined is the current footprint EMP_CUR associated with the starting location POS_INI (the distance coefficients are initialized to infinity, except for C_DIST(EMP_CUR)).

The vertex thus determined is added (sub-step F90_2) to the set E_V. Consequently, the set E_V is no longer empty and contains the footprint EMP_CUR.

Subsequently, for each vertex EMP_i of the graph G_NEW that does not belong to the set E_V (i.e. for each distinct footprint of EMP_CUR in the present case), the following sub-steps are performed:

- a test (sub-step F90_3) is performed to verify whether the distance coefficient C_DIST(EMP_i) is strictly greater than the sum between the distance coefficient associated with the vertex previously added to the set E_V (i.e. C_DIST(EMP_CUR) in the present case) and the weight associated with said vertex EMP_i as well as with said vertex previously added to the set E_V (i.e. W(EMP_CUR, EMP_i) in the present case). In other words, it is verified whether:

$$C\_DIST(EMP\_i) > C\_DIST(EMP\_CUR) + W(EMP\_CUR, EMP\_i);$$

- if the test is positive, the distance coefficient C_DIST (EMP_i) is modified (sub-step F90_4), otherwise, it is not modified. More specifically, if the test is positive, the new value of C_DIST(EMP_i) is equal to the sum between the distance coefficient associated with the vertex previously added to the set E_V (i.e. C_DIST (EMP_CUR) in the present case) and the weight associated with said vertex EMP_i as well as with said vertex previously added to the set E_V (i.e. W(EMP_CUR, EMP_i) in the present case). In other words, if the test is positive, we have: C_DIST (EMP_i)=C_DIST(EMP_CUR)+W(EMP_CUR, EMP_i);
- still in the case where said test is positive, the vertex previously added to the set E_V (i.e. the footprint EMP_CUR in the present case) is designated (sub-step F90_5) as being the predecessor of the vertex EMP_i (a vertex can have only one or no predecessor, this predecessor being able to change during iterations of said sub-steps F90_3 to F90_5).

The execution of said sub-steps F90_3, F90_4 and F90_5 for the vertices of the graph G_NEW that do not belong to the set E_V will be illustrated.

For this purpose, the vertex EMP_2 will be considered first. As illustrated by FIG. 11B, said vertex EMP_2 is connected by a single edge to the vertex EMP_CUR. Consequently, W(EMP_CUR, EMP_2) is equal to 1. The distance coefficient C_DIST(EMP_2) which is initialized as being infinite is therefore strictly greater than the sum C_DIST (EMP_CUR)+W(EMP_CUR, EMP_2)=0+1=1. Consequently, the value of C_DIST(EMP_2) is modified to be equal to C_DIST (EMP_CUR)+W(EMP_CUR, EMP_2) that is to say equal to 1. In addition, EMP_CUR is designated as being the predecessor of EMP_2.

The operations described above for EMP_2 provide the same results for the vertex EMP_4. Indeed, said vertex EMP_4 is connected by a single edge to the vertex EMP_CUR, as illustrated by FIG. 11B.

On the other hand, all the vertices of the graph G_NEW other than EMP_CUR, EMP_2 and EMP_4 do not have their respective distance coefficients modified since they do not verify the inequation: C_DIST(EMP_i)>C_DIST (EMP_CUR)+W(EMP_CUR, EMP_i). Furthermore, these vertices of the graph G_NEW other than EMP_CUR, EMP_2 and EMP_4 are not assigned any predecessors.

Once said sub-step F90_3 (and possibly said sub-steps F90_4 and F90_5) has been executed for each vertex EMP_i of the graph G_NEW that does not belong to the set E_V, said sub-steps F90_1 to F90_3 (and optionally said sub-steps F90_4 and F90_5) are iterated.

The first iteration of said sub-steps F90_1 to F90_3 (and possibly said sub-steps F90_4 and F90_5) will be illustrated by way of example. For the first iteration of step F90_1, the set E_V now includes the vertex EMP_CUR. Two vertices of the graph G_NEW provide a minimum distance coefficient among the vertices of the graph G_NEW that do not belong to the set E_V: EMP_2 and EMP_4. Indeed, it follows from the previous implementation of sub-steps F90_1 to F90_5 that C_DIST(EMP_2)=C_DIST (EMP_4)=1 (on the other hand, we always have C_DIST (EMP_i) which is infinite for EMP_i different from EMP_2 and EMP_4).

A choice is therefore made between EMP_2 and EMP_4 to designate the vertex that will be added to the set E_V during the first iteration of sub-step F90_2. It is considered, without limitation, that the vertex EMP_2 is chosen and therefore added to E_V which now contains EMP_CUR and EMP_2 (it is noted that this choice is arbitrary, the vertex EMP_4 can just as well be chosen).

Therefore said sub-step F90_3 (and possibly said sub-steps F70_4 and F90_5) is iterated for each of the vertices that do not belong to the set E_V. The case of the vertex EMP_4 that does not belong to the set E_V will be considered first. Then, insofar as a single edge connects the vertices EMP_2 and EMP_4 (as illustrated by FIG. 11B), we have:

$$1=C\_DIST(EMP\_4)<C\_DIST(EMP\_2)+W(EMP\_2, EMP\_4)=1+1=2.$$

Consequently, said sub-steps F90_4 and F90_5 are not iterated, so that the distance coefficient C_DIST(EMP_4) is not modified (it remains equal to 1) and the predecessor of the vertex EMP_4 remains the current footprint EMP_CUR.

The case of the vertex EMP_5 that does not belong to the set E_V will now be considered. We have that C_DIST (EMP_5) is infinite because initialized as such and still never modified. Moreover, we also have that W(EMP_2, EMP_5) is equal to 1 because a single edge connects the vertices EMP_2 and EMP_5. Consequently, we have:

$$C\_DIST(EMP\_5)>C\_DIST(EMP\_2)+W(EMP\_2, EMP\_5),$$

so that said sub-steps F90_4 and F90_5 are iterated. More specifically, the distance coefficient C_DIST(EMP_5) is modified to take the value C_DIST(EMP_2)+W(EMP_2, EMP_5)=1+1=2. Furthermore, the vertex EMP_2 is designated as being the predecessor of the vertex EMP_5.

The iteration of said sub-step F90_3 (and possibly of said sub-steps F90_4 and F90_5) is performed for each of the other vertices that do not belong to the set E_V.

Once this is completed, sub-steps F90_1 to F90_3 (and possibly said sub-steps F90_4 and F90_5) are iterated again, etc. The iteration process continues as long as there is a vertex of the graph G_NEW that does not belong to the set E_V.

Once all the iterations have been completed, step F90 includes a selection (sub-step F90_6), among the footprint(s) of the set L_DEST, of the footprint whose distance coefficient is minimal. In the present examplary implementation, only one footprint belongs to L_DEST, namely EMP_10. It is therefore said footprint EMP_10 that is selected.

The sequence SEQ, which forms the intermediate path PATH_INT, is then determined (sub-step F90_7) so that:

- for two successive footprints EMP_i, EMP_j of said sequence SEQ (EMP_j succeeds EMP_i), the footprint EMP_i is the predecessor of EMP_j;
- EMP_10 is the last footprint of the sequence SEQ.

It is therefore understood that the sequence SEQ is built backwards, by taking into account the different predecessors determined during the different iterations.

Ultimately, in the example of FIG. 11, it is obtained, at the end of the first implementation of step F90, that the first footprint EMP_PATH_INT_1 of the intermediate path determined using the Dijkstra algorithm is the footprint EMP_2.

The user U2 therefore moves in the area Z by using the sensory data displayed on the screen of localization terminal D5. Said sensory data are those of said locating set E_REP and which are associated with the transmitter devices identified by the footprint EMP_2 and not identified by the footprint EMP_CUR. During its movement, the localization terminal D5 emits the ambient signal and the stopper D6 detects the transmitter devices T that are illuminated by said ambient signal and that belong to the locating set E_REP. When the number of transmitter devices T detected is at least equal to the fraction considered for the neighborhood criterion CRIT_V to be satisfied, this means that an intermediate location POS_INT has been determined by the stopper D6. Therefore, in the present exemplary embodiment, the stopper D6 transmits an information data in the form of a sound (audible alert) to warn the user U2 that he has reached said intermediate location POS_INT. Following that, steps F20 to F160 can be reiterated.

Ultimately, in the example of FIG. 11, the successive iterations of steps F20 to F160 allow ensuring that the user navigates in the area Z from first footprint to first footprint of intermediate paths, to finally reach the footprint EMP_10 identifying the target transmitter device T_END. Sub-FIG. 11C represents the path (arrows) followed by the user U2. Once an intermediate location satisfying the neighborhood criterion for the target transmitter device T_END is reached by the user U2 in the footprint EMP_10, it is able to definitively join said target transmitter device T_END thanks to the associated sensory data (image).

The invention has been described so far by considering that a single emitter device D1 (mapping terminal in the embodiments considered above) can emit an ambient signal during the navigation preparation phase. However, nothing excludes envisaging embodiments in which the navigation system 10 includes, for said navigation preparation phase, a plurality of emitter devices similar to the emitter device D1. More particularly, in these other embodiments, each emitter device belonging to said plurality of emitter devices is associated with one or several locations among said locations POS_1, . . . , POS_P. Moreover, the locations associated with an emitter device are distinct from those associated with another emitter device. In other words, in these other embodiments, said locations POS_1, . . . , POS_P are distributed among several emitter devices similar to the emitter device D1. Thus, it is for example possible to envisage having a number of emitter devices equal to P, each of said P emitter devices being associated with a location among said locations POS_1, . . . , POS_P.

The invention has moreover been described so far considering that all the devices belonging to the navigation system 10 are distinct from each other. However, the invention is not limited by such provisions, and it is possible to envisage that:

- the emitter device D5 (localization terminal D5 in the embodiments considered above) and the emitter device D1 (mapping terminal D1 in the embodiments considered above) are one and the same device, and/or
- the device D6 for determining an intermediate location (stopper D6 in the embodiments considered above) and the receiver device D2 (base station D2 in the embodiments considered above) are one and the same device, and/or
- the device D4 for determining an intermediate path (tracker D4 in the embodiments considered above) and the device D3 for determining a graph (mapper D3 in the embodiments considered above) are one and the same device.

Nothing excludes envisaging that the transmitter devices T form an integral part of the navigation system 10.

It has further been considered so far that it is the receiver device D2 that implements the step of determining the footprint EMP_i (step E40[*i*] of the navigation preparation method). Of course, it is also possible to envisage that the determination of the footprint EMP_i is implemented by a device other than said receiver device D2 (and furthermore other than one of said devices D1, D3, D4, D5 and D6), this other device obtaining from the receiver device D2 information relating to the transmitter devices T detected by said receiver device D2.

It is important to note that the invention can also be implemented by envisaging a neighborhood criterion CRIT_V which differs from the one described so far, so that it is not necessary for the navigation system 10 to include a device D6 for determining an intermediate location (stopper D6 in the embodiments considered above). Indeed, and according to other embodiments, the neighborhood criterion can be defined so as to be satisfied if the emitter device D5 (localization terminal D5 in the embodiments considered above) reaches, during its movement (step F130 of the navigation method), a location at which is situated:

- a transmitter device given among the transmitter device(s) belonging to said locating set E_REP. For example, it may be a transmitter device chosen by the user U2 among the list of transmitter device(s) belonging to the locating set E_REP; or
- any transmitter device among the transmitter device(s) belonging to said locating set E_REP.

Finally, the invention has also been described so far by considering that a device intended to move in the area Z (emitter device D1 and/or emitter device D5) is held by a user, so that a movement of said device corresponds to a movement of said user. That said, the invention remains applicable in the case where a device intended to move in the area Z (emitter device D1 and/or emitter device D5) is not held by any user and is able to move autonomously.

To this end, and according to one exemplary embodiment, such a device corresponds to a mechatronic device (for example a robot) including drive means (such as for example an electric or thermal motor, etc.) as well as movement means (such as wheels, tracks, etc.). Such a mechatronic device further includes identification means configured to identify, in the environment of the area Z, one or several transmitter devices T from their respective sensory data. For example, said identification means can correspond to visual identification means (recognition of shapes/images) and include:

- storage means (magnetic hard disk, electronic memory, optical disk, etc.) in which data and a computer program are stored, in the form of a set of program code instructions to be executed to implement implements a visual identification method,
- at least one processor to execute the instructions of said visual identification method,
- image acquisition means, such as a video camera or a photo camera,
- means for controlling said image acquisition means.

Of course, nothing excludes considering, according to other exemplary embodiments not detailed here, a device configured in a suitable manner to move autonomously from sensory data other than images (sounds, videos, etc).

The invention claimed is:

1. A method for determining a graph modeling a geographical area, said geographical area including at least one transmitter device configured to backscatter towards a receiver device an ambient signal emitted by an emitter device for detection by said receiver device, said method comprising:

- obtaining at least one footprint of said geographical area, said at least one footprint having been determined for a location of said geographical area and corresponding to a data identifying, among said at least one transmitter device, any transmitter devices detected by the receiver device when the emitter device emits the ambient signal from the location associated with said footprint, wherein the footprint comprises a set of identifiers determined based on a presence or absence of the detected transmitter devices in said geographical area, and determining a graph having at least two vertices, each vertex of said graph formed of a respective footprint of said at least one footprint, two vertices of said graph being connected by an edge if footprints relating to said two vertices include at least one transmitter device detected in common.

2. A method for ambient backscatter communication in a geographical area, said geographical area including at least one transmitter device configured to backscatter towards a receiver device a pre-existing ambient signal emitted by an emitter device, distinct from the receiver device, for detection by said receiver device, said method including steps of:

moving the emitter device so as to reach at least one location of said geographical area, emitting said ambient signal when said at least one location is reached, wherein the emitted ambient signal enables determination of a footprint corresponding to a data identifying, among said at least one transmitter device, transmitter devices detected by the receiver device from said at least one location, the footprint comprising a set of identifiers determined based on a presence or absence of the detected transmitter devices, and wherein the footprints form vertices of a graph in which two vertices are connected if corresponding footprints include at least one transmitter device detected in common.

3. A method for determining an intermediate path in a geographical area, said geographical area including at least one transmitter device configured to backscatter towards a receiver device a pre-existing ambient signal emitted by an emitter device, distinct from the receiver device, for detection by said receiver device, said intermediate path being configured to connect a starting location to a neighborhood of a target transmitter device among said at least one transmitter device, said method comprising:

obtaining a current footprint determined for said starting location and corresponding to a data identifying, among said at least one transmitter device, any transmitter devices detected by the receiver device when said receiver device occupies said starting location, determining whether the current footprint forms a vertex of a graph determined according to the method of claim 1, upon determining that said current footprint forms a vertex of the graph determined according to the method of claim 1, determining a sequence of footprints of the graph, said sequence forming an intermediate path of minimum length to connect the starting location to a footprint of the graph identifying said target transmitter device, and upon determining that said current footprint does not form a vertex of the graph determined according to the method of claim 1:

updating the graph so that the current footprint forms a vertex of the updated graph, two vertices of said updated graph being connected by an edge if the footprints relating to said two vertices include at least one transmitter device detected in common, determining a sequence of footprints of the updated graph, said sequence forming an intermediate path of minimum length to connect the starting location to a footprint of the updated graph identifying said target transmitter device.

4. The method of claim 3, wherein the intermediate path is determined by means of the Dijkstra algorithm.

5. A method for moving in a geographical area, said geographical area including at least one transmitter device configured to backscatter towards a receiver device a pre-existing ambient signal emitted by an emitter device, distinct from the receiver device, for detection by said receiver device, said intermediate path being configured to connect a starting location to a neighborhood of a target transmitter device among said at least one transmitter device, said method comprising:

emitting the ambient signal at said starting location, obtaining a locating set of transmitter devices formed of any transmitter devices identified by the first footprint of an intermediate path determined according to the method of claim 3 and not identified by a current footprint determined for said starting location during the determination of said intermediate path, obtaining at least one sensory data making it possible to identify in a sensory manner, in the environment of said geographical area, the locating set of transmitter devices, moving the emitter device in the area so as to reach an intermediate location satisfying a neighborhood criterion with at least one transmitter device belonging to said locating set, said movement being performed by using said sensory data.

6. A method for determining an intermediate location in a geographical area, said geographical area including at least one transmitter device configured to backscatter towards a receiver device a pre-existing ambient signal emitted by an emitter device, distinct from the receiver device, for detection by said receiver device, said receiver device being configured to connect a starting location to a neighborhood of a given transmitter device among said at least one transmitter device, said method including steps of:

obtaining a locating set of transmitter devices formed of any transmitter devices identified by a first footprint of an intermediate path determined according to the method of claim 3 and not identified by a current footprint determined for said starting location during the determination of said intermediate path, and during movement of the emitter device in the geographical area to reach an intermediate location, said movement being performed by using sensory data making it possible to identify in a sensory manner, in the environment of said geographical area, the locating set of transmitter devices, the emitter device emitting the ambient signal during its movement:

detecting, by said receiver device, a transmitter device, determining an intermediate location satisfying a neighborhood criterion making it possible to verify whether the emitter device has reached a location for which the receiver device detects, from the ambient signal emitted by said transmitter device, a number of transmitter devices at least equal to a given fraction of the number of transmitter devices belonging to said locating set, and transmitting to the emitter device an information data able to indicate that the intermediate location is reached.

7. A method for navigating in a geographical area, said geographical area including at least one transmitter device configured to backscatter towards a receiver device a pre-existing ambient signal emitted by an emitter device, distinct from the receiver device, for detection by said receiver device, said method including a set of steps of comprising:

moving in said geographical area by performing at least one iteration of the following set of steps:

determining an intermediate path using the method of claim 3;

emitting, at said starting location, the ambient signal, obtaining a locating set of transmitter devices formed of any transmitter devices identified by a first footprint of the intermediate path and not identified by the current footprint determined for said starting location during the determination of said intermediate path, obtaining at least one sensory data making it possible to identify in a sensory manner, in the environment of said geographical area, the locating set of transmitter devices, and moving the emitter device in the geographical area to reach an intermediate location satisfying a neighborhood criterion with at least one transmitter device belonging to said locating set, said movement being performed by using said sensory data, said set of steps being iterated as long as the first footprint of the intermediate path does not identify said target transmitter device, the starting location considered in a second or subsequent iteration of said set of steps corresponding to the intermediate location considered in the previous iteration, and the graph considered in a second or subsequent iteration of said set of steps for a possible update corresponding to the graph to which the intermediate path determined during the previous iteration belongs.

8. The method of claim 5, wherein said neighborhood criterion is satisfied if the emitter device reaches a location at which is situated a given or any transmitter device among the transmitter devices of said locating set.

9. The method according to claim 7, wherein said set of steps for which at least one iteration is performed also includes a step of determining an intermediate location satisfying a neighborhood criterion making it possible to verify whether the emitter device has reached a location for which the receiver device detects, from the ambient signal emitted by said transmitter device, a number of transmitter devices at least equal to a given fraction of the number of transmitter devices belonging to said locating set.

10. A device for determining a graph modeling a geographical area, said geographical area including at least one transmitter device configured to backscatter towards a receiver device an ambient signal emitted by an emitter device for detection by said receiver device, said determination device including:

an obtaining module configured to obtain at least one footprint of said geographical area, said at least one footprint having been determined for a location of said geographical area and corresponding to a data identifying, among said at least one transmitter device, any transmitter devices detected by the receiver device when the emitter device emits the ambient signal from the location associated with said footprint, wherein said footprint comprises a set of identifiers determined based on a presence or absence of the detected transmitter devices in said geographical area, and a determination module configured to determine a graph having at least one vertex, each vertex of said graph formed of a respective footprint of said at least one footprint, two vertices of said graph being connected by an edge if the footprints relating to said two vertices include at least one transmitter device detected in common.

11. A device for ambient backscatter communication in a geographical area, said area including at least one transmitter device configured to backscatter towards a receiver device a pre-existing ambient signal emitted by said emitter device, distinct from the receiver device, so as to be detected by said receiver device, said emitter device including an emission module configured to emit said ambient signal when, following a movement of said emitter device to reach at least one location of said geographical area, said at least one location has been reached, wherein the emitted ambient signal enables determination of a footprint corresponding to a data identifying, among said at least one transmitter device, transmitter devices detected by the receiver device from said at least one location, the footprint comprising a set of identifiers determined based on a presence or absence of the detected transmitter devices, and wherein the footprints form vertices of a graph in which two vertices are connected if corresponding footprints include at least one transmitter device detected in common.

12. A device for determining an intermediate path in a geographical area, said geographical area including at least one transmitter device configured to backscatter towards a receiver device a pre-existing ambient signal emitted by an emitter device, distinct from the receiver device, for detection by said receiver device, said intermediate path being configured to connect a starting location to a neighborhood of a target transmitter device, among said at least one transmitter device, said determination device including:

a first obtaining module configured to obtain a graph determined by the device of claim 10, a second obtaining module configured to obtain a current footprint determined for said starting location and corresponding to a data identifying, among said at least one transmitter device, any transmitter devices detected by the receiver device when said receiver device occupies said starting location, a test module configured to verify whether said current footprint forms or does not form a vertex of the obtained graph, an update module configured to, if said current footprint does not form a vertex of the obtained graph, update the obtained graph so that the current footprint forms a vertex of the updated graph, two vertices of said updated graph being connected by an edge if the footprints relating to said two vertices include at least one transmitter device detected in common, a determination module configured to determine a sequence of footprints of the obtained graph or, if the graph was updated by the update module, the updated graph, said sequence forming an intermediate path of minimum length to connect the starting location to a footprint of the obtained graph or the updated graph identifying said target transmitter device.

13. A device for emitting an ambient signal in a geographical area, said geographical area including at least one transmitter device configured to backscatter towards a receiver device a pre-existing ambient signal emitted by said emitter device, distinct from the receiver device, for detection by said receiver device, said emitter device being configured to connect a starting location to a neighborhood of a given transmitter device among said at least one transmitter device, and including:

an emission module configured to emit the ambient signal at said starting location, a first obtaining module configured to obtain a locating set of transmitter devices formed of any transmitter devices identified by a first footprint of an intermediate path determined by the device of claim 12 and not identified by a current footprint determined for said starting location during the determination of said intermediate path, a second obtaining module configured to obtain at least one sensory data, making it possible to identify in a sensory manner, in the environment of said geographical area, the locating set of transmitter devices.

14. A device for determining an intermediate location in a geographical area, said geographical area including at least one transmitter device configured to backscatter towards a receiver device a pre-existing ambient signal emitted by said emitter device, distinct from the receiver device, for detection by said receiver device, said emitter device being configured to connect a starting location to a neighborhood of a given transmitter device among said at least one transmitter device, said determination device including:

an obtaining module configured to obtain a locating set of transmitter devices formed of any transmitter devices identified by the first footprint of an intermediate path determined by the device of claim 12 and not identified by a current footprint determined for said starting location during the determination of said intermediate path, a detection module configured to detect, when the emitter device moves in the area by emitting the ambient signal, one or several transmitter devices, a determination module configured to determine, when the emitter device moves in the area by emitting the ambient signal, an intermediate location satisfying a neighborhood criterion making it possible to verify whether the emitter device has reached a location for which the receiver device detects, from the ambient signal emitted by said emitter device, a number of transmitter devices at least equal to a given fraction of the number of transmitter devices belonging to said locating set, and a transmission module configured to transmit to the emitter device an information data able to indicate that the intermediate location is reached.

15. A system for navigating in a geographical area, said geographical area including at least one transmitter device configured to backscatter towards a receiver device an ambient signal emitted by an emitter device for detection by said receiver device, said system including:

an emitter device including an emission module configured to emit said ambient signal when, following a movement of said emitter device to reach at least one location of said area, said at least one location has been reached;

a graph determining device for determining a graph modeling the geographical area, the graph determining device comprising:

an obtaining module configured to obtain at least one footprint of said geographical area, said at least one footprint having been determined for a location of said geographical area and corresponding to a data identifying, among said at least one transmitter device, any transmitter devices detected by the receiver device when the emitter device emits the ambient signal from the location associated with said footprint, wherein the footprint comprises a set of identifiers determined based on a presence or absence of the detected transmitter devices, and a determination module configured to determine a graph having at least two vertices formed of said at least one footprint, two vertices of said graph being connected by an edge if footprints relating to said two vertices include at least one transmitter device detected in common;

an intermediate path determination device including:

a first obtaining module configured to obtain a graph determined by the graph determining device, a second obtaining module configured to obtain a current footprint determined for said starting location and corresponding to a data identifying, among said at least one transmitter device, any transmitter devices detected by the receiver device when said receiver device occupies said starting location, a test module configured to verify whether said current footprint forms or does not form a vertex of the obtained graph, an update module configured to, if said current footprint does not form a vertex of the obtained graph, update the obtained graph so that the current footprint forms a vertex of the updated graph, two vertices of said updated graph being connected by an edge if the footprints relating to said two vertices include at least one transmitter device detected in common, a determination module configured to determine a sequence of footprints of the obtained graph or, if the graph was updated by the update module, the updated graph, said sequence forming an intermediate path of minimum length to connect the starting location to a footprint of the obtained graph or the updated graph identifying said target transmitter device; and the intermediate location determining device of claim 14;

wherein the emitter device further comprises:

a first obtaining module configured to obtain a locating set of transmitter devices formed of any transmitter devices identified by a first footprint the intermediate path determined by the intermediate path determining device and not identified by a current footprint determined for said starting location during the determination of said intermediate path, and a second obtaining module configured to obtain at least one sensory data making it possible to identify in a sensory manner, in the environment of said geographical area, the locating set of transmitter devices.

* * * * *